United States Patent
Kim

(10) Patent No.: US 11,457,378 B2
(45) Date of Patent: Sep. 27, 2022

(54) METHOD AND APPARATUS FOR TRANSMITTING DATA IN COMMUNICATION SYSTEM

(71) Applicant: Samsung Electronics Co., Ltd., Gyeonggi-do (KR)

(72) Inventor: Donggun Kim, Seoul (KR)

(73) Assignee: Samsung Electronics Co., Ltd

( * ) Notice: Subject to any disclaimer, the term of this patent is extended or adjusted under 35 U.S.C. 154(b) by 145 days.

(21) Appl. No.: 16/042,402

(22) Filed: Jul. 23, 2018

(65) Prior Publication Data
US 2019/0028924 A1    Jan. 24, 2019

(30) Foreign Application Priority Data

Jul. 21, 2017 (KR) .................. 10-2017-0092713
Oct. 24, 2017 (KR) .................. 10-2017-0138507

(51) Int. Cl.
*H04W 28/06* (2009.01)
*H04W 76/15* (2018.01)
(Continued)

(52) U.S. Cl.
CPC .......... *H04W 28/06* (2013.01); *H04W 72/06* (2013.01); *H04W 72/10* (2013.01); *H04W 72/1215* (2013.01); *H04W 76/15* (2018.02)

(58) Field of Classification Search
CPC ..... H04W 76/15; H04W 72/06; H04W 72/10; H04W 72/1215; H04W 28/06
(Continued)

(56) References Cited

U.S. PATENT DOCUMENTS

2011/0039558 A1   2/2011   Lee et al.
2011/0170495 A1   7/2011   Earnshaw et al.
(Continued)

FOREIGN PATENT DOCUMENTS

CN   102474874       5/2012
WO   WO 2017/026667  2/2017

OTHER PUBLICATIONS

MediaTek Inc., "Enhancements to Logical Channel Prioritization", R2-1705519, 3GPP TSG-RAN WG2 #98, May 15-19, 2017, 5 pages.
(Continued)

*Primary Examiner* — Chi Tang P Cheng
(74) *Attorney, Agent, or Firm* — The Farrell Law Firm, P.C.

(57) ABSTRACT

The disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for transmitting information in a communication system is provided. The method includes receiving information for allocating at least two transmission resources, allocating at least two transmission resources, identifying a data unit corresponding to at least one logical channel, determining a size of the data unit, which is to be transmitted based on a size of the allocated at least two transmission resources, and transmitting data to a receiver based on the determined size of the data unit.

8 Claims, 19 Drawing Sheets

(51) Int. Cl.
  *H04W 72/06* (2009.01)
  *H04W 72/10* (2009.01)
  *H04W 72/12* (2009.01)
(58) Field of Classification Search
  USPC .......................................................... 370/329
  See application file for complete search history.

(56) References Cited

U.S. PATENT DOCUMENTS

| | | | |
|---|---|---|---|
| 2012/0057547 A1 | 3/2012 | Lohr et al. | |
| 2017/0048903 A1 | 2/2017 | Yi et al. | |
| 2018/0270839 A1* | 9/2018 | Loehr | H04L 5/0094 |
| 2018/0310308 A1* | 10/2018 | Loehr | H04W 72/1273 |
| 2020/0119896 A1* | 4/2020 | Li | H04W 72/0453 |

OTHER PUBLICATIONS

InterDigital Inc., "Details of the Logical Channel Prioritization Procedure for NR", R2-1704911, 3GPP TSG-RAN WG2 #98, May 15-19, 2017, 5 pages.
International Search Report dated Oct. 31, 2018 issued in counterpart application No. PCT/KR2018/008245, 4 pages.
ZTE Corporation, "Consideration on the LCP Operation", R2-1706896, 3GPP TSG-RAN WG2# NR_AdHoc#2, Jun. 27-29, 2017, 7 pages.
LG Electronics Inc., "Logical Channel Prioritization for Aggregated Carriers", R2-094630, Aug. 24-28, 2009, 3 pages.
European Search Report dated Feb. 14, 2020 issued in counterpart application No. 18834945.0-1215, 6 pages.
ASUSTeK, "Consideration on the details of LCP", R2-1705307, 3GPP TSG-RAN WG2 Meeting #98, May 15-19, 2017, 3 pages.
European Search Report dated Sep. 28, 2021 issued in counterpart application No. 18834945.0-1215, 8 pages.
Qualcomm Incorporated, "LCP with the Presence of Multiple UL Grants", R2-1706522, 3GPP TSG-RAN WG2 Meeting NR ad-hoc 2, Jun. 27-29, 2017, 2 pages.
InterDigital Communications, "LCP and Scheduling Aspects for Multiple Numerologies", R2-1700236, 3GPP TSG-RAN WG2 NR Ad Hoc, Jan. 17-19, 2017, 3 pages.
Chinese Office Action dated May 18, 2022 issued in counterpart application No. 201880048729.2, 18 pages.
Huawei, HiSilicon, "Multiplexing and LCP Procedure of Different TTIs", R2-1701884, 3GPP TSG-RAN WG2 Meeting #97, Feb. 13-17, 2017, 4 pages.
Samsung, "The Impact of Processing Order of UL Grants on LCP", R2-1706754, 3GPP TSG RAN WG2 NR AH #2, Jun. 27-29, 2017, 5 pages.
Korean Office Action dated Jul. 25, 2022 issued in counterpart application No. 10-2017-0138507, 10 pages.

* cited by examiner

METHOD AND APPARATUS FOR TRANSMITTING DATA IN COMMUNICATION SYSTEM

CROSS-REFERENCE TO RELATED APPLICATION(S)

This application is based on and claims priority under 35 U.S.C. § 119(a) to Korean Patent Application Serial No. 10-2017-0092713, which was filed on Jul. 21, 2017, in the Korean Intellectual Property Office, and Korean Patent Application Serial No. 10-2017-0138507, which was filed on Oct. 24, 2017, in the Korean Intellectual Property Office, the entire disclosure of each of which is incorporated herein by reference.

BACKGROUND

1. Field

The disclosure relates, generally, to a method and apparatus for transmitting data in the transmitter of a mobile communication system, and more specifically, to a method of distributing transmission resources and a method and apparatus for configuring transmission data in a transmitter of a mobile communication system.

2. Description of the Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In 5G technology and the IoT technology, as it is necessary to efficiently perform data transmission, there is a need for a method and apparatus for allocating allocated data to be transmitted more efficiently.

In a next-generation mobile communication system, a maximum data transfer rate of 20 Gbps in downlink and a maximum data transfer rate of 10 Gbps in uplink needs to be supported, and a very short delay response time is usually required. Accordingly, in the case of a user equipment (UE) served in a next-generation mobile communication system, many transmission resources need to be allocated and the processing speed of data to be transmitted needs to be very fast. A next-generation mobile communication system may allocate a plurality of transmission resources to a UE. In order for a UE to configure data to be transmitted in a plurality of transmission resources, respectively, the transmission resources need to be distributed for each logical channel and data to be transmitted in each transmission resource needs to be prepared as data configured from each logical channel by taking the distributed transmission resource into consideration.

SUMMARY

The disclosure has been made to address at least the disadvantages described above and to provide at least the advantages described below. Accordingly, an aspect of the disclosure provides an efficient method of distributing transmission resources to a UE and an efficient method and apparatus for a UE to configure transmission data in a next-generation mobile communication system.

An aspect of the disclosure provides an efficient method of distributing transmission resources to a UE and an efficient method and apparatus for a UE to configure transmission data, which can be applied both the long-term evolution (LTE) system and a next-generation mobile communication system.

In accordance with an aspect of the disclosure, there is provided a method for transmitting information in a communication system. The method includes receiving information for allocating at least two transmission resources, allocating at least two transmission resources, identifying a data unit corresponding to at least one logical channel, determining a size of the data unit, which is to be transmitted based on a size of the allocated at least two transmission resources; and transmitting data to a receiver based on the determined size of the data unit.

In accordance with an aspect of the disclosure, there is provided a transmitter in a communication system. The transmitter includes a transceiver and a controller coupled with the transceiver and configured to receive information for allocating at least two transmission resources, identify a data unit corresponding to at least one logical channel, determine a size of the data unit which is to be transmitted based on a size of the allocated at least two transmission resources, and transmit data to a receiver based on the determined size of the data unit.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION

Figure 1:
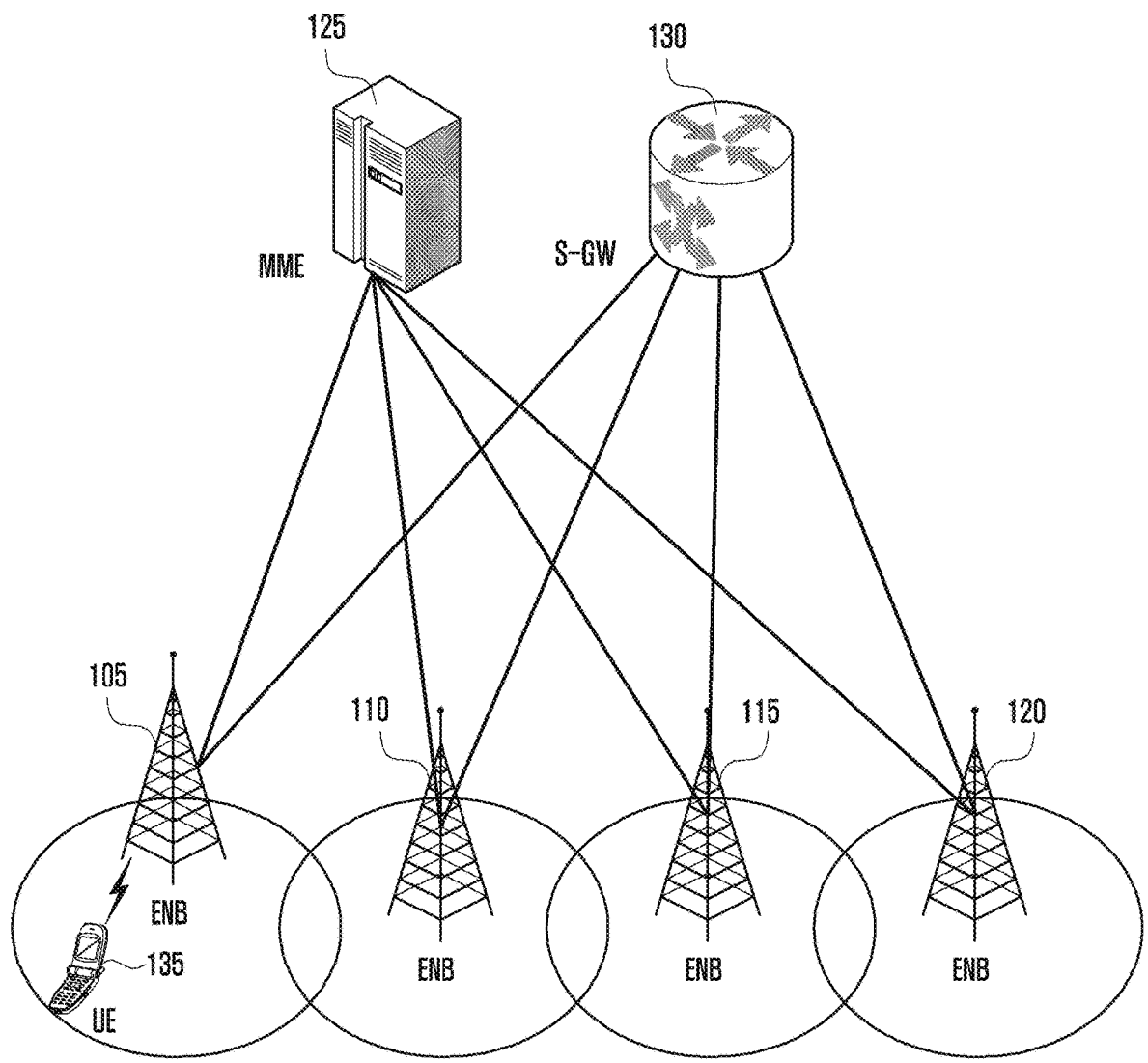
FIG. 1 is a diagram of an LTE system, according to an embodiment.

Embodiments of the disclosure will be described herein below with reference to the accompanying drawings. However, the embodiments of the disclosure are not limited to the specific embodiments and should be construed as including all modifications, changes, equivalent devices and methods, and/or alternative embodiments of the present disclosure. In the description of the drawings, similar reference numerals are used for similar elements.

The terms "have," "may have," "include," and "may include" as used herein indicate the presence of corresponding features (for example, elements such as numerical values, functions, operations, or parts), and do not preclude the presence of additional features.

The terms "A or B," "at least one of A or/and B," or "one or more of A or/and B" as used herein include all possible combinations of items enumerated with them. For example, "A or B," "at least one of A and B," or "at least one of A or B" means (1) including at least one A, (2) including at least one B, or (3) including both at least one A and at least one B.

The terms such as "first" and "second" as used herein may use corresponding components regardless of importance or an order and are used to distinguish a component from another without limiting the components. These terms may be used for the purpose of distinguishing one element from another element. For example, a first user device and a second user device may indicate different user devices regardless of the order or importance. For example, a first element may be referred to as a second element without departing from the scope the disclosure, and similarly, a second element may be referred to as a first element.

It will be understood that, when an element (for example, a first element) is "(operatively or communicatively) coupled with/to" or "connected to" another element (for example, a second element), the element may be directly coupled with/to another element, and there may be an intervening element (for example, a third element) between the element and another element. To the contrary, it will be understood that, when an element (for example, a first element) is "directly coupled with/to" or "directly connected to" another element (for example, a second element), there is no intervening element (for example, a third element) between the element and another element.

The expression "configured to (or set to)" as used herein may be used interchangeably with "suitable for," "having the capacity to," "designed to," "adapted to," "made to," or "capable of" according to a context. The term "configured to (set to)" does not necessarily mean "specifically designed to" in a hardware level. Instead, the expression "apparatus configured to . . . " may mean that the apparatus is "capable of . . . " along with other devices or parts in a certain context. For example, "a processor configured to (set to) perform A, B, and C" may mean a dedicated processor (e.g., an embedded processor) for performing a corresponding operation, or a generic-purpose processor (e.g., a central processing unit (CPU) or an application processor (AP)) capable of performing a corresponding operation by executing one or more software programs stored in a memory device.

The terms used in describing the various embodiments of the disclosure are for the purpose of describing particular embodiments and are not intended to limit the disclosure. As used herein, the singular forms are intended to include the plural forms as well, unless the context clearly indicates otherwise. All of the terms used herein including technical or scientific terms have the same meanings as those generally understood by an ordinary skilled person in the related art unless they are defined otherwise. The terms defined in a generally used dictionary should be interpreted as having the same or similar meanings as the contextual meanings of the relevant technology and should not be interpreted as having ideal or exaggerated meanings unless they are clearly defined herein. According to circumstances, even the terms defined in this disclosure should not be interpreted as excluding the embodiments of the disclosure.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the disclosure may include at least one of an application-specific integrated circuit (ASIC) chip, a field-programmable gate array (FPGA), and a programmable-logic device for performing operations which has been known or are to be developed hereinafter.

An electronic device according to the disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a MPEG-1 audio layer-3 (MP3) player, a mobile medical device, a camera, and a wearable device. The wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

The electronic device may be a home appliance. The home appliance may include at least one of, for example, a television, a digital video disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

The electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment device, an electronic device for a ship (e.g., a navigation device for a ship, and a gyro-compass), avionics, security devices, an automotive head unit, a robot for home or industry, an automatic teller machine (ATM) in banks, point of sales (POS) devices in a shop, or an Internet of things device (IoT) (e.g., a light bulb, various sensors, electric or gas meter, a sprinkler device, a fire alarm, a thermostat, a streetlamp, a toaster, a sporting goods, a hot water tank, a heater, a boiler, etc.).

The electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may also be a flexible device. Further, the electronic device is not limited to the aforementioned devices, and may include an electronic device according to the development of new technology.

The terms and names defined in the $3^{rd}$ generation partnership project long term evolution (3GPP LTE) standard or terms and names modified from the defined terms and names are used herein. However, the disclosure is not so limited, and the terms and names used herein may be applied to systems based on other standards.

Furthermore, although the methods and apparatuses described herein can be used for data transmission in a UE, these methods and apparatuses can be used with other transmission apparatus, e.g., can be applied in a transmission apparatus that performs an LCP operation.

Hereinafter, an electronic device will be described with reference to the accompanying drawings. In the disclosure, the term "user" may indicate a person using an electronic device or a device (e.g., an artificial intelligence electronic device) using an electronic device.

FIG. 1 is a diagram of an LTE system, according to an embodiment.

Referring to FIG. 1, as shown, a RAN of the LTE system includes ENBs (or Node Bs or base stations) 105, 110, 115 and 120, a mobile management entity (MME) 125 and a serving-gateway (S-GW) 130. A UE (or a terminal) 135 may access an external network through the ENBs 105-120 and the S-GW 130.

In FIG. 1, the ENBs 105-120 correspond to the existing Node Bs of the universal mobile telecommunications system (UMTS). The ENB is connected to the UE 135 through a radio channel and performs a more complex function than the existing Node B. In the LTE system, all of types of user traffic including a real-time service, such as voice over IP (VoIP) through the Internet protocol, are served through a shared channel. Accordingly, a device that performs schedules by collecting state information, such as the buffer state, available transmission power state, and channel state of UEs, is necessary. The ENBs 105-120 may be in charge or control of such a device. In general, one ENB controls multiple cells. In order to implement the transfer rate of 100 Mbps, the LTE system uses orthogonal frequency division multiplexing (OFDM) as a radio access technology in a 20 MHz bandwidth. Furthermore, the LTE system adopts an adaptive modulation & coding (AMC) scheme for determining a modulation scheme and a channel coding rate based on the channel state of a UE. The S-GW 130 provides a data bearer and generates or removes a data bearer under the control of the MME 125. The MME is in charge of or controls various control functions in addition to a mobility management function for a UE, and may be connected to multiple ENBs.

Figure 2:
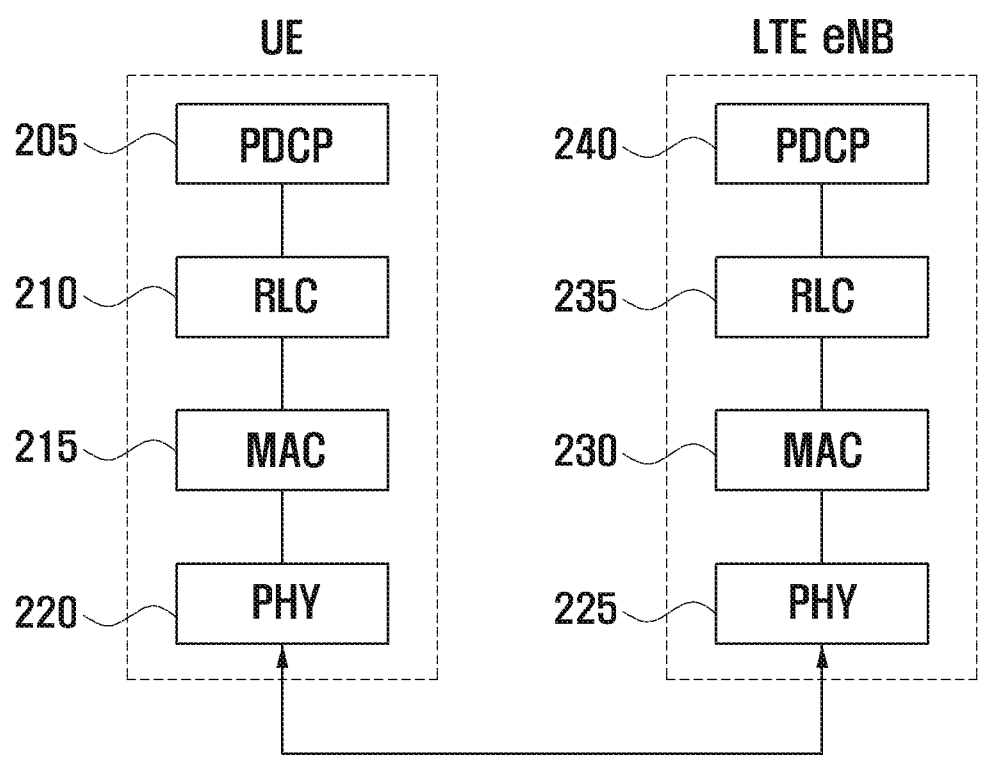
FIG. 2 is a diagram of a radio protocol architecture in the LTE system, according to an embodiment.

FIG. 2 is a diagram of radio protocol architecture in the LTE system, according to an embodiment.

Referring to FIG. 2, the radio protocol of the LTE system includes packet data convergence protocols (PDCPs) 205 and 240, radio link control (RLC) 210 and 235, and medium access control (MAC) 215 and 230 in a UE and an ENB, respectively. The PDCPs 205 and 240 are in charge of or control an operation, such as IP header compression/restoration. The functions of the PDCP 205, 240 may include at least one of the following contents.

- Header compression and decompression: robust header compression (ROHC) only;
- Transfer of user data;
- In-sequence delivery of upper layer PDUs in a PDCP re-establishment procedure for radio link control acknowledged mode (RLC AM);
- Reordering function (for split bearers in DC (only support for RLC AM): PDCP PDU routing for transmission and PDCP PDU reordering for reception);
- Duplicate detection of lower layer service data units (SDUs) in a PDCP re-establishment procedure for RLC AM;
- Retransmission of PDCP SDUs at handover and, for split bearers in DC, of PDCP PDUs in a PDCP data-recovery procedure, for RLC AM;
- Ciphering and deciphering; and
- Timer-based SDU discard in UL.

The RLC 210, 235 reconfigures a PDCP PDU in a proper size and performs an ARQ operation. The functions of the RLC may include at least one of the following contents.

- Transfer of upper layer PDUs;
- Automatic repeat request (ARQ) function (Error Correction through ARQ (only for AM data transfer));
- Concatenation, segmentation and reassembly of RLC SDUs (only for unacknowledged mode (UM) and AM data transfer);
- Re-segmentation of RLC data PDUs (only for AM data transfer);
- Reordering of RLC data PDUs (only for UM and AM data transfer);
- Duplicate detection (only for UM and AM data transfer);
- Protocol error detection (only for AM data transfer);
- RLC SDU discard (only for UM and AM data transfer); and
- RLC re-establishment.

The MAC 215, 230 is connected to multiple RLC layer devices configured in one UE, and performs an operation of multiplexing RLC PDUs with a MAC PDU and demultiplexing RLC PDUs from a MAC PDU. The functions of the MAC may include at least one of the following contents.

- Mapping between logical channels and transport channels;
- Multiplexing/demultiplexing of MAC SDUs belonging to one or different logical channels into/from transport blocks (TB) delivered to/from the physical layer on transport channels;
- Scheduling information reporting;
- Error correction through Hybrid ARQ (HARQ);
- Priority handling between logical channels of one UE;
- Priority handling between UEs by means of dynamic scheduling;
- MBMS service identification;
- Transport format selection; and
- Padding.

A physical layer 220, 225 performs an operation of channel-coding and modulating higher layer data, generating the higher layer data into an OFDM symbol, and transmitting the OFDM symbol through a radio channel or demodulating an OFDM symbol received through a radio channel, channel-decoding the OFDM symbol, and transmitting the OFDM symbol to a higher layer.

Figure 3:
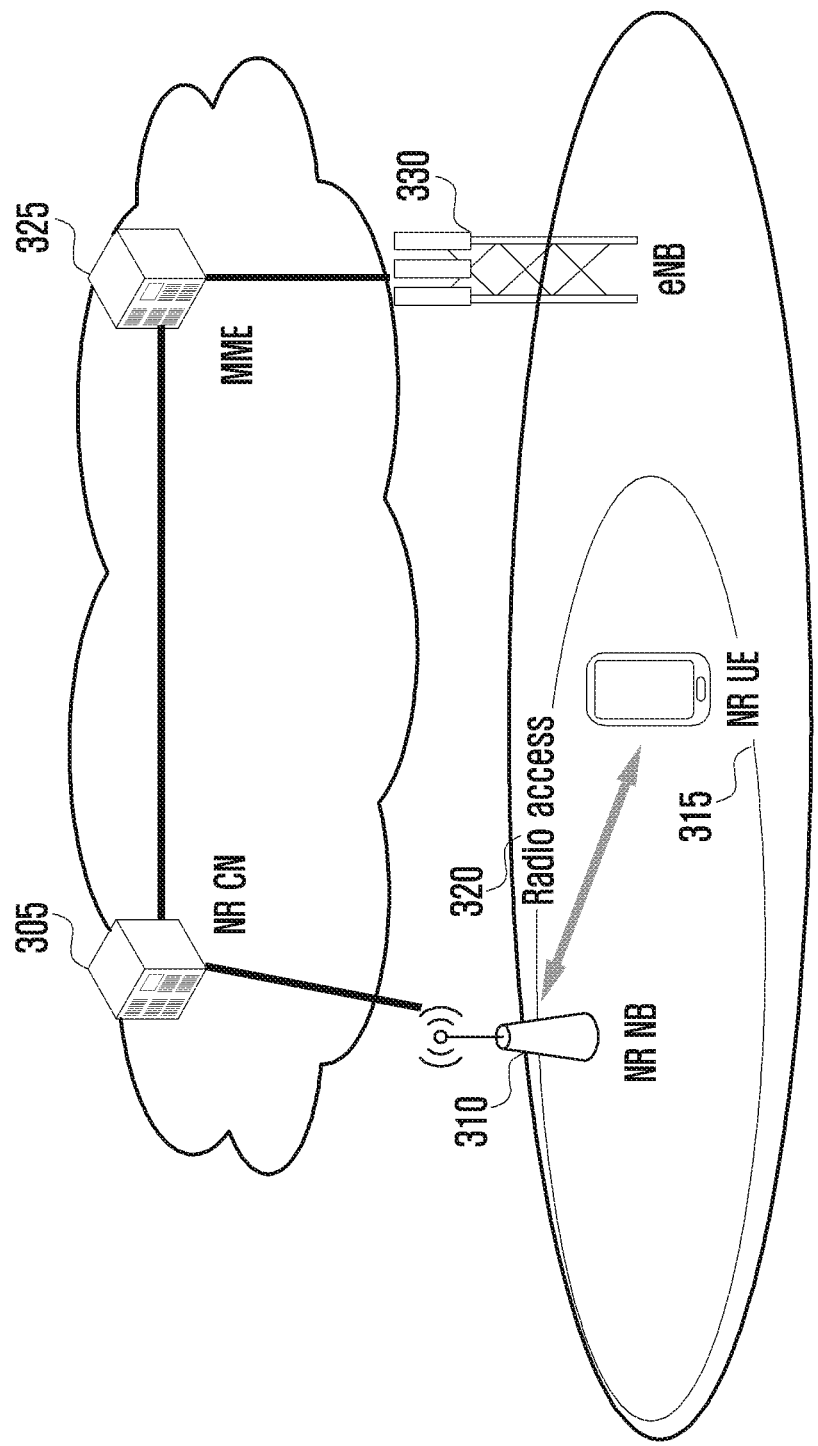
FIG. 3 is a diagram of a next-generation mobile communication system, according to an embodiment.

FIG. 3 is a diagram of a next-generation mobile communication system, according to an embodiment.

Referring to FIG. 3, as shown, a radio access network of a next-generation mobile communication system (hereinafter referred to as an NR or 5G) includes a new radio node B (hereinafter referred to as an NR gNB or an NR base station) 310 and a new radio core network (NR CN) 305. A new radio UE (NR UE or a NR terminal) 315 may access an external network through the NR gNB 310 and the NR CN 305.

In FIG. 3, the NR gNB 310 corresponds to an ENB of the existing LTE system. The NR gNB is connected to the NR UE 315 through a radio channel, and may provide excellent services compared to the existing Node B. The next-generation mobile communication system requires a device for performing scheduling by collecting state information, such as the buffer state, available transmission power state, and channel state of UEs, because all of the types of user traffic are served through a shared channel. The NR gNB 310 is in charge of or controls the device described above with reference to FIG. 2. In general, one NR gNB controls multiple cells. In order to implement ultra-high speed data transfer compared to the existing LTE, the next-generation mobile communication system may have the existing maximum bandwidth or more and may additionally graft the beamforming technology using OFDM as a radio access technology. The next-generation mobile communication system adopts the AMC scheme that determines a modulation scheme and a channel coding rate based on the channel state of a UE. The NR CN 305 performs functions, such as mobility support, a bearer configuration, and a quality of service (QoS) configuration. The NR CN 305 is in charge of various control functions in addition to a mobility management function for a UE, and may be connected to multiple ENBs. The next-generation mobile communication system may also operate in conjunction with the existing LTE system. The NR CN is connected to an MME 325 through a network interface. The MME may be connected to an eNB 330, that is, the existing ENB.

Figure 4:
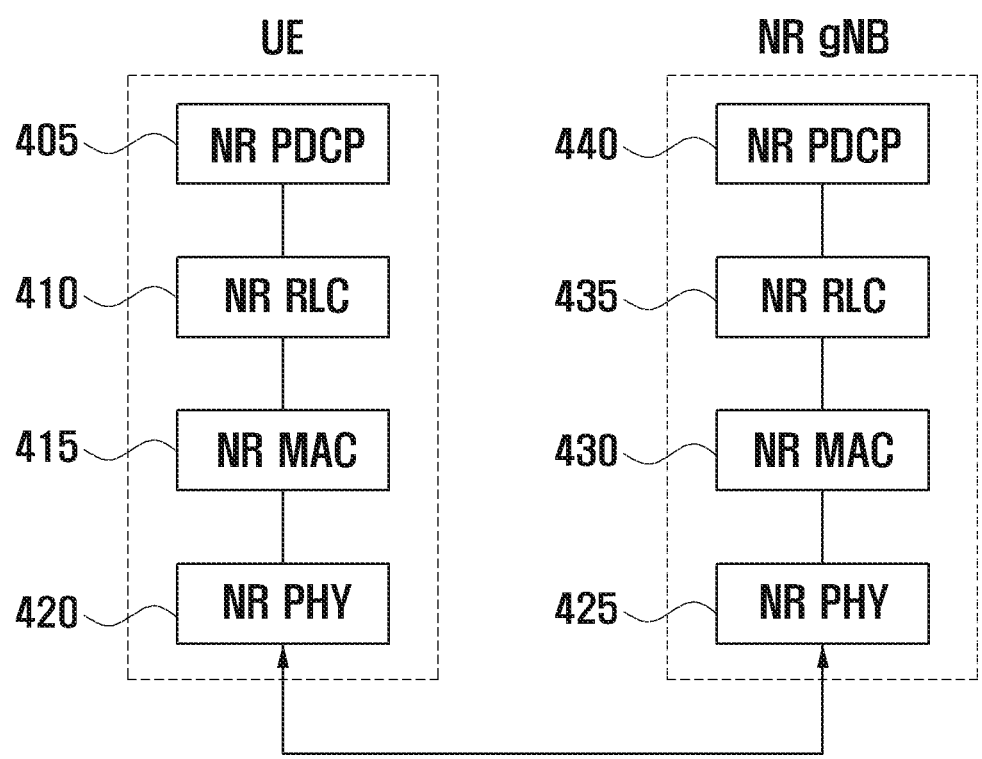
FIG. 4 is a diagram of a radio protocol architecture of a next-generation mobile communication system, according to an embodiment.

FIG. 4 is a diagram of radio protocol architecture of a next-generation mobile communication system, according to an embodiment.

Referring to FIG. 4, a radio protocol of the next-generation mobile communication system includes NR PDCPs 405 and 440, NR RLC 410 and 435, and NR MAC 415 and 430 in a UE and an NR gNB. Major functions of the NR PDCP 405, 440 may include at least one of the following contents.

- Header compression and decompression: ROHC only;
- Transfer of user data;
- In-sequence delivery of upper layer PDUs;
- PDCP PDU reordering for reception;
- Duplicate detection of lower layer SDUs;
- Retransmission of PDCP SDUs;
- Ciphering and deciphering; and
- Timer-based SDU discard in UL.

The reordering function of the NR PDCP device can include reordering PDCP PDUs, received from a lower layer, in sequence based on a PDCP sequence number (SN). The reordering function may include transmitting data in a reordered sequence to a higher layer, reordering orders and recording lost PDCP PDUs, making a status report on lost PDCP PDUs to the transmission side, and requesting the retransmission of lost PDCP PDUs.

The function of the NR RLC 410, 435 may include at least one of the following.

Transfer of upper layer PDUs;
In-sequence delivery of upper layer PDUs;
Out-of-sequence delivery of upper layer PDUs;
Error Correction through ARQ;
Concatenation, segmentation and reassembly of the RLC SDUs;
Re-segmentation of RLC data PDUs;
Reordering of RLC data PDUs;
Duplicate detection;
Protocol error detection;
RLC SDU discard; and
RLC re-establishment.

The in-sequence delivery function of the NR RLC device can include sequentially transmitting RLC SDUs received from a lower layer to a higher layer, and may include reassembling and transmitting multiple RLC SDUs if one RLC SDU has been originally segmented into the multiple RLC SDUs and received. The in-sequence delivery function may include reordering received RLC PDUs based on a RLC SN or a PDCP SN, reordering orders and recording lost RLC PDUs, transmitting a status report on lost RLC PDUs to the transmission side, requesting the retransmission of lost RLC PDUs, sequentially transmitting only RLC SDUs prior to a lost RLC SDU to a higher layer when the lost RLC SDU occurs, sequentially transmitting all of RLC SDUs received until a given timer expires to a higher layer when the timer expires although there is a lost RLC SDU, and sequentially transmitting all of RLC SDUs received so far to a higher layer when a given timer expires although there is a lost RLC SDU.

The in-sequence delivery function may include processing RLC PDUs in order that the RLC PDUs are received (in order of arrival regardless of the order of a SN) and transmitting the RLC PDUs to a PDCP device regardless of their orders (i.e., out-of sequence delivery). The in-sequence delivery function may include receiving segments stored in a buffer or segments to be received subsequently, reconfiguring the segments in one complete RLC PDU, processing the RLC PDU, and transmitting the RLC PDU to the PDCP device. The NR RLC layer may not include a concatenation function, and the concatenation function may be performed by the NR MAC layer or may be substituted with the multiplexing function of the NR MAC layer.

The out-of-sequence delivery function of the NR RLC device may include directly transmitting RLC SDUs received from a lower layer to a higher layer regardless of their orders. The out-of-sequence delivery function may include reassembling multiple RLC SDUs if one RLC SDU has been originally segmented into the multiple RLC SDUs and received. The out-of-sequence delivery function may include storing the RLC SNs or PDCP SNs of received RLC PDUs, reordering their orders, and recording lost RLC PDUs.

The NR MAC 415, 430 may be connected to multiple NR RLC layer devices configured in one UE. The functions of the NR MAC may include at least one of the following.

Mapping between logical channels and transport channels;
Multiplexing/demultiplexing of the MAC SDUs;
Scheduling information reporting;
Error correction through HARQ;
Priority handling between logical channels of one UE;
Priority handling between the UEs by means of dynamic scheduling;
MBMS service identification;
Transport format selection; and
Padding.

An NR PHY layer 420, 425 may perform channel-coding and modulating higher layer data, generating the higher layer data into an OFDM symbol, and transmitting the OFDM symbol to a radio channel or demodulating an OFDM symbol received through a radio channel, channel-decoding the OFDM symbol, and transferring the OFDM symbol to a higher layer.

In the LTE system, the structure in which data is processed may be different from that of a next-generation mobile communication system. Specifically, the LTE system has a RLC concatenation function in the RLC layer. Accordingly, a UE cannot perform random data pre-processing until it receives a UL transmission resource from a network. When a UE receives a UL transmission resource, the UE generates one RLC PDU by concatenating PDCP PDUs in the PDCP layer and performs data transmission by transmitting the one RLC PDU to the MAC layer. In contrast, a next-generation mobile communication system has a data processing structure in which the PDCP layer may generate a PDCP PDU before a UL transmission resource is received, the RLC layer may generate a RLC PDU by processing the PDCP PDU and transmit the RLC PDU to the MAC layer, and the MAC layer may produce a MAC sub-header and a MAC SDU because the RLC concatenation function is not present in the RLC layer. A linear predictive coding (LPC) operation according to embodiments of the specification may be applied to next-generation mobile communication system in addition to LTE.

Figure 5A:
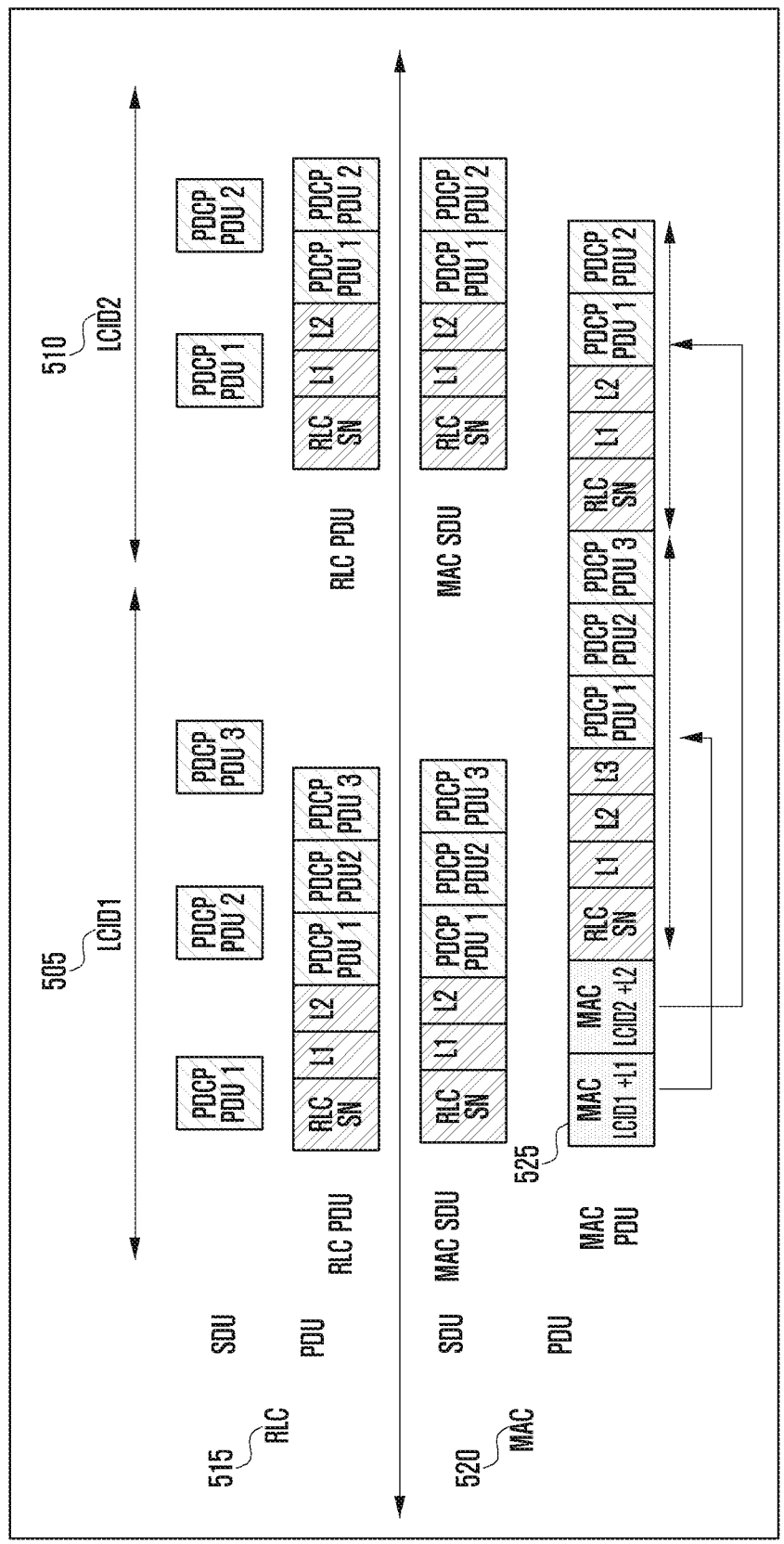
FIGS. 5A and 5B are diagrams of a structure in which data is processed in the LTE system, according to an embodiment.
Figure 5B:
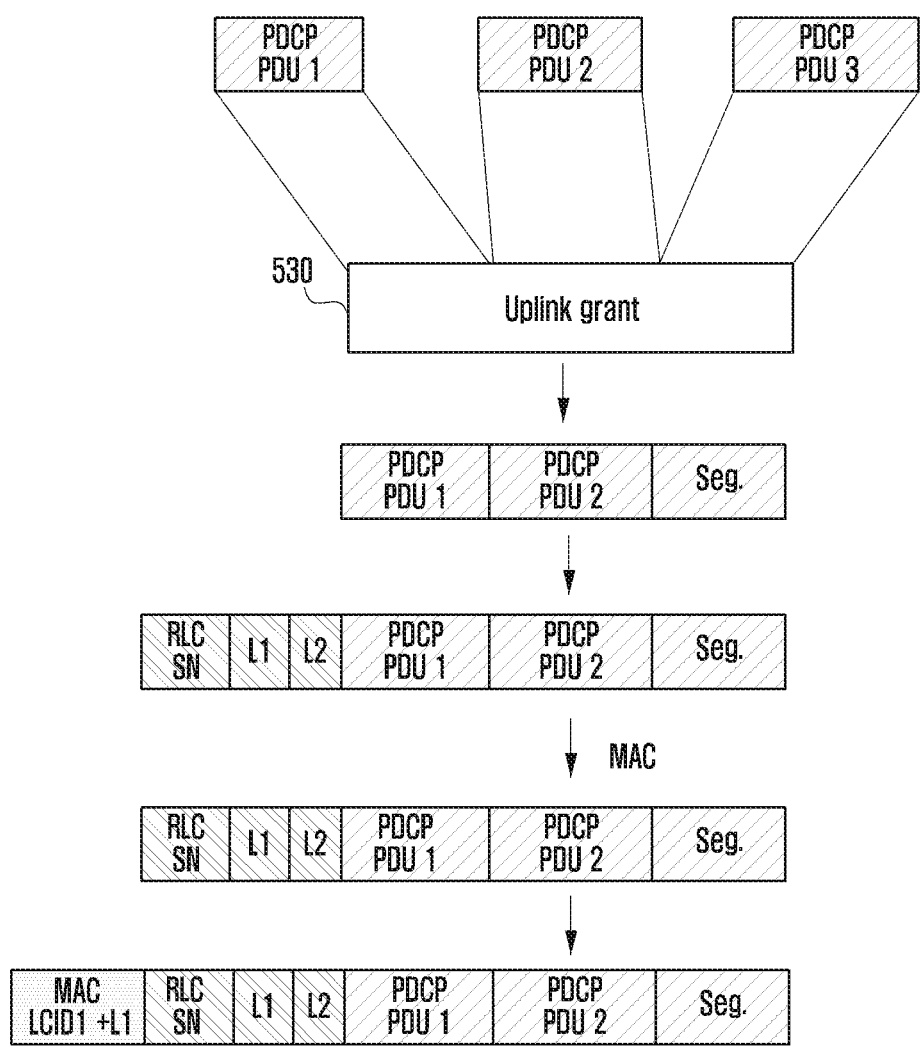

FIGS. 5A and 5B are diagrams of a structure in which data is processed in the LTE system, according to an embodiment.

Referring to FIGS. 5A and 5B, in the LTE system, PDCP layer and RLC layer data processing is performed for each logical channel. A logical channel corresponding to a logical channel identifier (ID) may be configured. A logical channel 1 505 and a logical channel 2 510 have different PDCP layers and RLC layers, and independent data processing is performed on the channels. One MAC PDU is configured by delivering RLC PDUs generated from the RLC layers of the respective logical channels to the MAC layer. The one MAC PDU is transmitted to a receiving stage. In the LTE system, the PDCP layer, the RLC layer, the MAC layer may include the functions described in FIG. 2, and may perform operations corresponding to the functions.

In the LTE system PDCP PDUs are concatenated in the RLC layer. A MAC PDU structure 525 may have a structure in which all of MAC sub-headers are positioned in the front part and a MAC SDU part is positioned in the rear part of a MAC PDU. Due to the characteristics in the LTE system, data processing cannot be previously performed or cannot be prepared in the RLC layer before a UL transmission resource (e.g., UL grant) is received. When a UL transmission resource 530 is received as in FIGS. 5A and 5B, a UE generates a RLC PDU by concatenating PDCP PDUs received from the PDCP layer based on a UL transmission resource.

After the MAC layer receives the UL transmission resource from an ENB, logical channel prioritization (LCP) is performed on the UL transmission resource, and the UL transmission resource is divided for each logical channel. The UL transmission resource 530 is a UL transmission resource allocated from the MAC layer. If the size of PDCP PDUs to be concatenated is not suitable for the UL transmission resource, the RLC layer may adjust the PDCP PDUs by performing a segmentation procedure so that the PDCP PDUs are suitable for the UL transmission resource.

The procedure may be performed for each logical channel, and each RLC device may configure a RLC header using concatenated PDCP PDUs and transmit a completed RLC PDU to the MAC device. The MAC device may configure RLC PDUs (MAC SDUs) received from respective RLC layers into a single MAC PDU and transmit the single MAC PDU by transmitting it to the PHY device. When the RLC header is configured, if the RLC device includes segmented information in the header by performing a segmentation operation, length information of each of the concatenated PDCP PDUs may be included in the header. A receiving stage may reassemble the PDCP PDUs based on information transmitted based on such processing.

As described above, in the LTE system, the regular data processing of the RLC layer, MAC layer and PHY layer may be started from the time when a UL transmission resource is received.

Figure 6A:
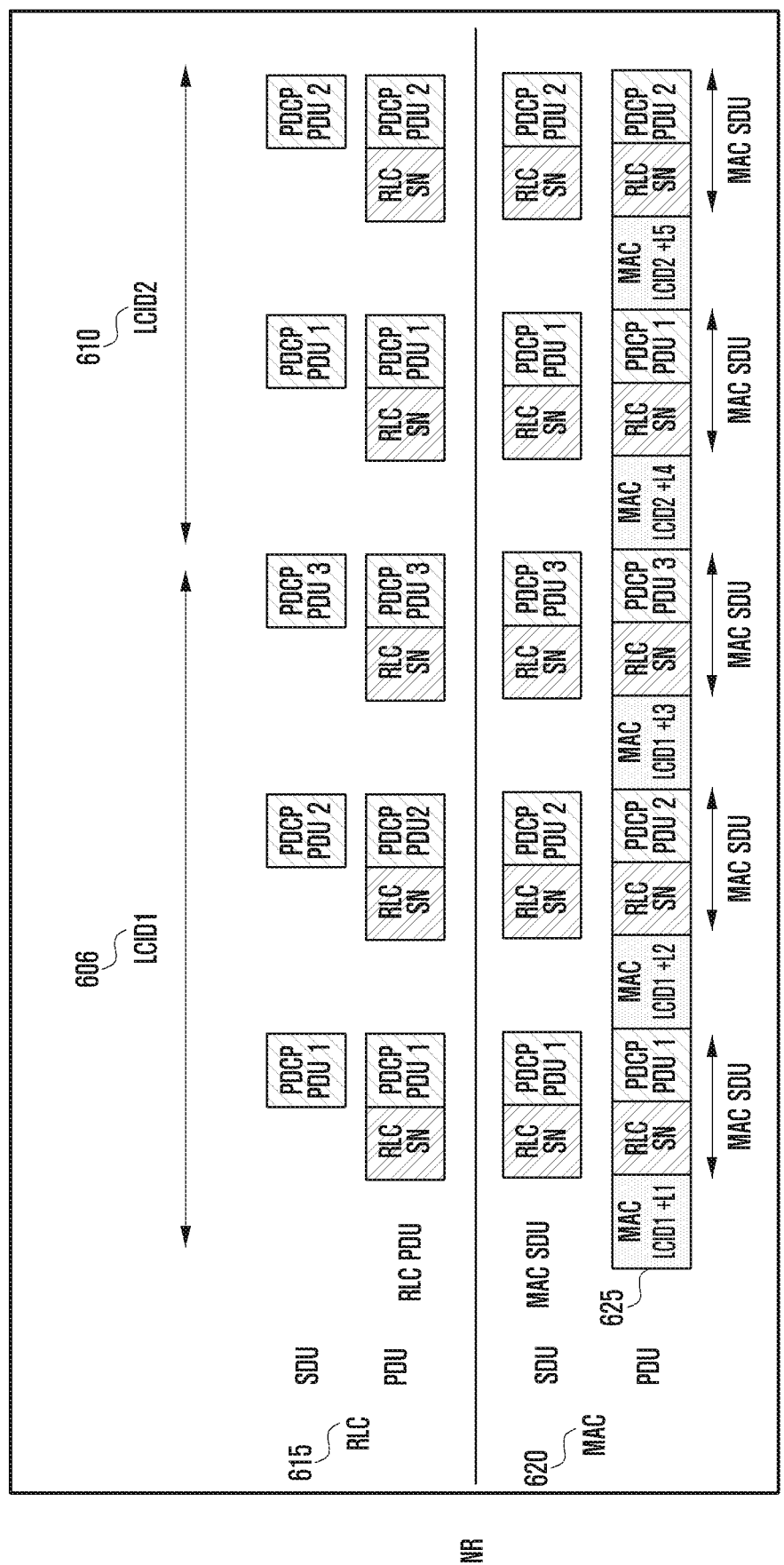
FIGS. 6A and 6B are diagrams of a structure in which data is processed in a next-generation mobile communication system, according to an embodiment.
Figure 6B:
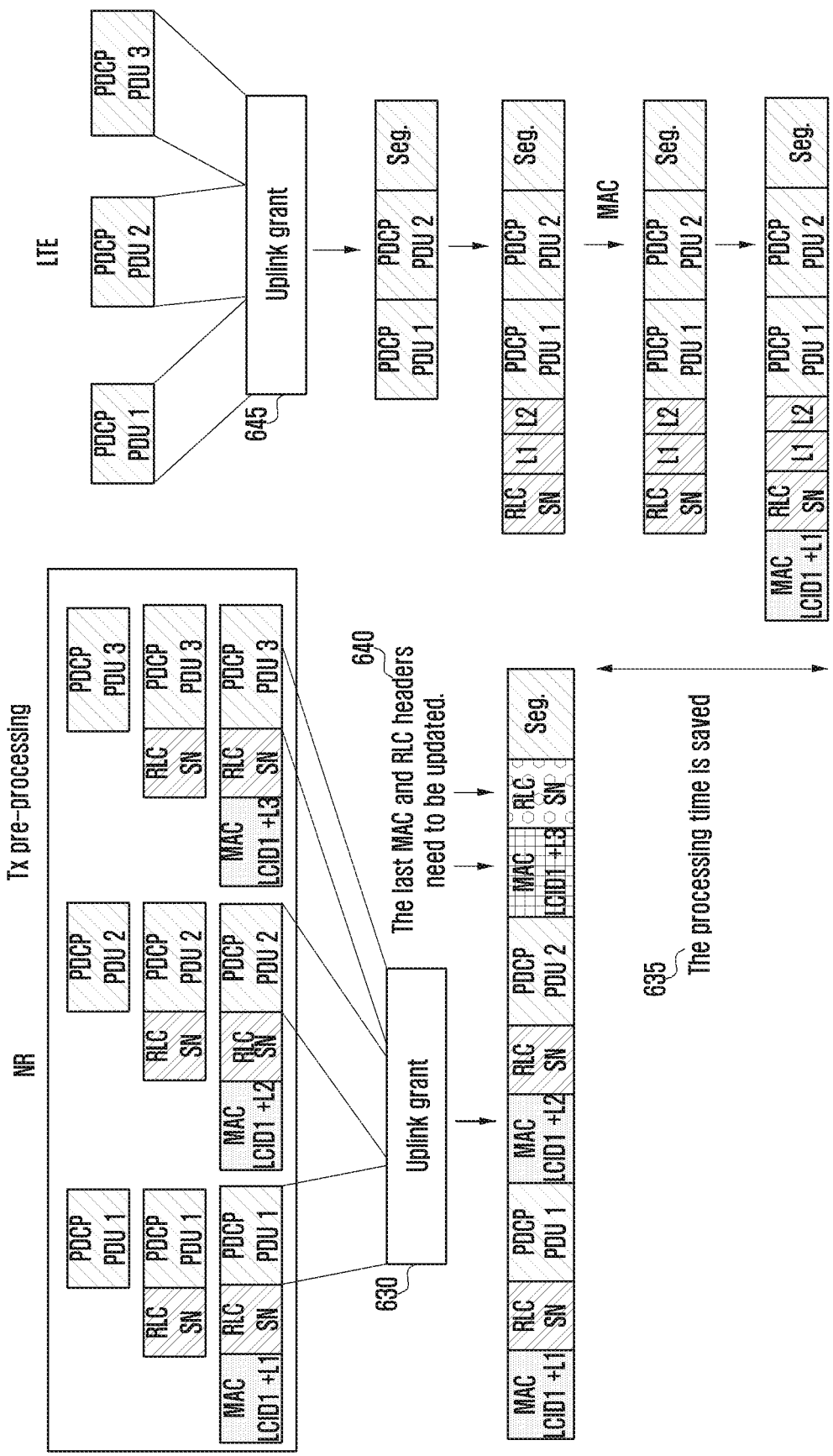

FIGS. 6A and 6B are diagrams of a structure in which data is processed in a next-generation mobile communication system, according to an embodiment.

Referring to FIGS. 6A and 6B, in the next-generation mobile communication system, PDCP layer and RLC layer data processing may be performed for each logical channel. A logical channel 1 605 and a logical channel 2 610 have different PDCP layers and RLC layers, and independent data processing may be performed on the channels. After one MAC PDU is configured by delivering RLC PDUs generated from the RLC layers of the respective logical channels to the MAC layer, it is transmitted to a receiving stag. In the LTE system, the PDCP layer, the RLC layer and the MAC layer may include the functions described in FIG. 4, and may perform operations corresponding to the functions.

A next-generation mobile communication system may not concatenate PDCP PDUs in the RLC layer, and may have the structure in which a MAC sub-header is included for each MAC SDU in a MAC PDU structure 625, that is, a structure in which a MAC sub-header is repeated in a MAC SDU unit. In the next-generation mobile communication system, pre-processing 630 may be previously performed on data before a UL transmission resource is received. That is, when a UE receives an IP packet in the PDCP layer before it receives a UL transmission resource, it may perform PDCP processing (ciphering, integrity protection, etc.) on the IP packet, may generate PDCP PDU by generating a PDCP header, may configure a RLC header by delivering the PDCP PDU to the RLC layer, may configure a RLC PDU, and may configure a MAC sub-header and MAC SDU by delivering the RLC PDU to the MAC layer.

When the implementation is performed, if the data pre-processing is not implemented, as in the LTE system, the UE may receive the UL transmission resource (e.g., UL grant) and then perform data processing. If transmission resources are allocated for each logical channel after an LCP procedure, a PDCP header may be configured by taking into consideration the size of the allocated transmission resource, a PDCP PDU may be generated, a RLC PDU may be generated by configuring a RLC header, and a MAC sub-header and a MAC SDU may be configured. If data pre-processing is not performed or implemented, a difference between the next-generation mobile communication system according to an embodiment and the LTE system is that data does not need to be concatenated in the RLC layer and that the next-generation mobile communication system may have a not-concatenated data structure.

When a UE receives a UL transmission resource 630, the UE may fetch a MAC sub-headers and MAC SDUs suitable for the size of the UL transmission resource and configure a MAC PDU. If the UL transmission resource is not sufficient, the UE may perform a segmentation operation in order to fill the allocated UL transmission resource up and efficiently use it. The UE may update a corresponding RLC header (segmented information or length information) and MAC header (L field because the length has changed) 640. Accordingly, when compared to the LTE system, assuming that the UL transmission resource 630, 645 is received at the same point of time, the next-generation mobile communication system can have a great advantage in the processing time as illustrated by reference number 635. The RLC layer and the PDCP layer may use a single common SN if necessary or if a SN has been configured in a network.

The pre-processing operation may be performed for each logical channel. The RLC PDUs pre-processed for each logical channel may be pre-processed into MAC SDUs and MAC sub-headers again in the MAC layer. When the UL transmission resource 630 is received in the MAC layer, the UE may allocate the UL transmission resource for each logical channel and multiplex the previously generated MAC SDUs and MAC sub-headers. The UL transmission resource is received in the MAC layer from an ENB, LCP is performed on the UL transmission resource, and the UL transmission resource is divided for each logical channel.

The MAC SDUs and MAC sub-headers previously generated by performing the data pre-processing for each logical channel are configured based on the UL transmission resource for each logical channel, and one MAC PDU is configured by multiplexing data for each logical channel and delivered to the PHY layer. If the UL transmission resource allocated to each logical channel is not sufficient, a segmentation request may be performed on the RLC layer.

When the RLC layer performs a segmentation operation, segmented information may be included in a header, and the header may be updated and delivered to the MAC layer. Accordingly, the MAC layer may update a corresponding MAC header.

As described above, the next-generation mobile communication system can perform the data processing of the PDCP layer, RLC layer, and MAC layer before it receives a UL transmission resource. In the above implementation, if the data pre-processing is not implemented, as in the LTE system, data processing may be performed after the UL transmission resource (e.g., UL grant) is received. If transmission resources are allocated for each logical channel after an LCP procedure, a PDCP PDU may be generated by configuring a PDCP header with consideration taken of the size of the allocated transmission resource, a RLC PDU may be generated by configuring a RLC header, and a MAC sub-header and MAC SDU may be configured. If the data pre-processing is not performed or implemented, a difference between the next-generation mobile communication system and the LTE system is that data does not need to be concatenated in the RLC layer.

The LCP procedure may include a procedure for a UE to distribute a UL transmission resource (e.g., UL grant) received from an ENB to each logical channel of the UE. When a UE receives a UL transmission resource of 500 Kbytes, the UE may perform an LCP procedure on the UL transmission resource, and may allocate a transmission resource of 100 Kbytes to a logical channel 1, allocate a transmission resource of 200 Kbytes to a logical channel 2 and allocate a transmission resource of 200 Kbytes to a logical channel 3 as the results of the execution. When the transmission resources are allocated, the size of a MAC sub-header or RLC header or PDCP header may be taken into consideration.

Also, when allocating the uplink transmission resource, the size of the MAC CE (Control Element) should be considered. That is, the MAC PDU must be configured according to the size of the transmission resource, and the MAC PDU may include a MAC subheader, an RLC header, a PDCP header, and a MAC CE. In this case, since the MAC CE has the highest priority, when the uplink transmission resource is received, the size of the MAC CE to be transmitted is excluded and the transmission resource allocation procedure is performed for the remaining uplink transmission resources. In order to allow the MAC CE to be transmitted, the resource to be transmitted is reserved in advance (according to the implementation, the transmission resource allocation procedure is performed for the remaining uplink transmission resources except for the size of the MAC subheaders, and may allocate transmission resources to each logical channel).

Figure 7:
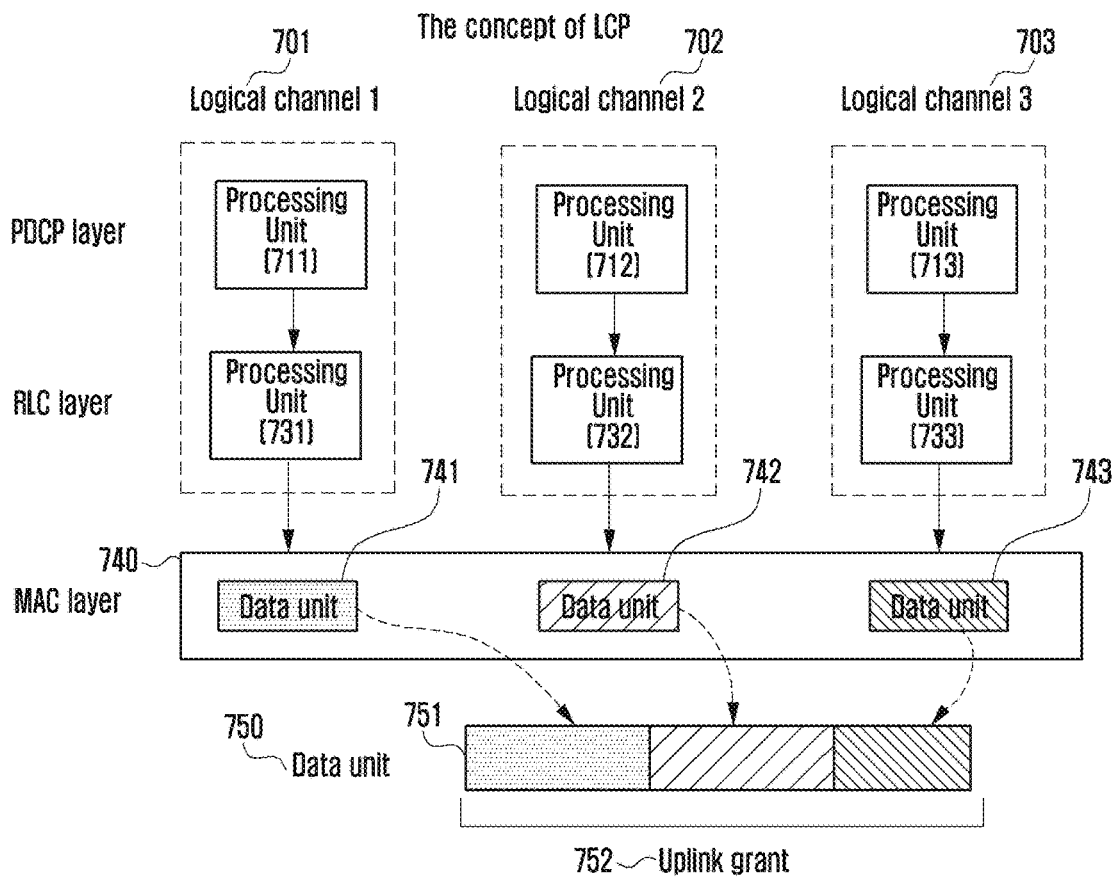
FIG. 7 is a diagram of a logical channel prioritization (LCP) procedure, according to an embodiment.

FIG. 7 is a diagram of the LCP procedure, according to an embodiment.

Referring to FIG. 7, logical channels for the data of four different services may include a logical channel 1 701, a logical channel 2 702, and a logical channel 3 703. Each logical channel may have a PDCP layer device and RLC layer device for processing data. The logical channels include processing devices 731, 732, 733 and 740 for generating data 741, 742 and 743 by performing segmentation and multiplexing based on the sizes of determined transmission resources according to the LCP procedure. A UE may receive configuration information about the priority, prioritized bit rate (PBR), bucket size duration (BSD) or numerology or transmission time interval (TTI) of each logical channel through a radio resource control (RRC) message, e.g., through a RRC connection reconfiguration (RRCConnectionReconfiguration message) (the PBR and the BSD may be assigned as prioritisedBitRate and bucketSizeDuration variables of the RRC message, and the numerology or TTI may be set through new variables or mapping information with the logical channel or logical channel configuration information (logicalchannelconfig) or bearer configuration information (drb-config)).

The priority value may be set so that priority is higher as the priority value is smaller or priority is higher as the priority value is greater. The UE performs an LCP procedure using the information. The LCP procedure consists of a token bucket model logically. Each logical channel has a token called "Bj" and has a bucket in which the token is contained (j is an index indicative of each logical channel). A logical channel 1, logical channel 2, logical channel 3 and logical channel 4 have tokens B1, B2, B3 and B4, respectively. The tokens are contained in a bucket1, bucket2, bucket3 and bucket4. When a UL transmission resource is allocated to a UE, the token indicates the size of a resource that may be occupied by each logical channel. A token value is added by PBR×TTI every transmission time interval (TTI). However, although the token value is increased by PBR×TTI every TTI, it cannot exceed a BSD, that is, a maximum size of each bucket. Accordingly, if the token value of the bucket reaches or exceeds a BSD value, the BSD value is maintained without adding the PBR×TTI value every TTI.

The LCP procedure is performed in two steps based on the configuration information and rule. First, logical channels having a token value greater than 0 are selected, and the LCP procedure is performed on the logical channels. In the first step, a UE allocates a UL transmission resource to each logical channel by taking into consideration priority and token value of each logical channel. In the first step, each logical channel may occupy the UL transmission resource corresponding to its token value based on the priority. In this step, each of the logical channels reduces its current token value by the size of a resource occupied in the UL transmission resource.

In the first step, if a resource remains after all the logical channels occupy the UL transmission resource by their token values, the second step is performed. In the second step, the logical channels occupy the remaining UL transmission resources based on their priority. In the second step, a resource allocation procedure is performed based on priority until all the buffers of the respective logical channels are empty or all the remaining UL transmission resource are used, and in the second step, the token is not reduced with respect to a resource occupied by each logical channel.

Variables are defined as follows in order to indicate the LCP procedure as a more detailed pseudo code. The following pseudo code may be an example of the LCP procedure and may have various modifications having the same meaning within the scope of the disclosure.

1. It is assumed that a total number of logical channels of a UE is K.

2. The UE calculates a UL transmission resource and indicates the size of the UL transmission resource as a variable "ULGrant."

3. The UE aligns logical channels based on their priority and maps them to a variable "LC_j" (j=1, 2, . . . , it is assumed that j is a natural number value and priority is higher as j is a lower value, e.g., priority may be LC_1>LC_2>LC_3>LC_4).

4. Each token value of each of the logical channels mapped to each LC_j is indicated as Bj, the size of data remained in each buffer is indicated as Buffer j, and a maximum size of each buffer is indicated as BSDj. A resource allocated to each of the logical channels is indicated as LC_grant_j.

The pseudo code for the LCP procedure using the variables is as follows.

Table 1 describes pseudo code related to a token update procedure.

TABLE 1

% A procedure of updating a token is performed every TTI as follows.
% Bj = 0, j = 1, 2, ..., K are initially set, and a PBR and BSD are set by an RRC message.
01    For j=1 to K
02        If Bj < BSDj,
03            Bj = Bj + PBR×TTI
04        else
05            Bj = BSDj
06        end
07    end Table 2 describes pseudo code related to a two-step LCP procedure. Such pseudo code may be used in the LTE system.

TABLE 2

```
% When a UL transmission resource (UplinkGrant) is allocated, a UE performs
the first step of the LCP procedure as follows.
    % A resource allocated to each logical channel is initially set as LC_grant_j = 0,
j = 1, 2, ..., K.
    01      For j = 1 to K
    02          If UplinkGrant >= Bj
    03              UplinkGrant = UplinkGrant - Bj;
    04              LC_grant_j = LC_grant_j + Bj;
    05              Bj = 0;
    06          else
    07              LC_grant_j = LC_grant_j + UplinkGrant;
    08              Bj = Bj - UplinkGrant;
    09              UplinkGrant = 0;
    10              break;
    11          end
    12      end
    % If a UL transmission resource remains after the first step, the following
second step is performed.
    12      If UplinkGrant > 0
    13          For j = 1 to K
    14              If UplinkGrant >= Buffer_j
    15                  UplinkGrant = UplinkGrant - Buffer_j;
    16                  LC_grant_j = LC_grant_j + Buffer_j;
    17                  Buffer_j = 0;
    18              else
    19                  LC_grant_j = LC_grant_j + UplinkGrant;
    20                  Buffer_j = Buffer_j - UplinkGrant;
    21                  UplinkGrant = 0;
    22                  break;
    23              end
    24          end
    25      end
```

When the UL transmission resources are divided and allocated to the logical channels through such an LCP procedure, data is generated and determined based on the allocated transmission resource in each logical channel, and the data is delivered to the MAC layer (741, 742 and 743 in FIG. 7), the MAC layer generates a MAC PDU 750 (FIG. 7) and transmits the data in UL.

In the next-generation mobile communication system, the aforementioned LCP procedure is basically used, but a procedure in which an additional numerology or TTI has been taken into consideration may be added. For example, the LCP procedure may be performed on only logical channels selected by the numerology or TTI. That is, transmission resources may be allocated to only the selected logical channels. Furthermore, in the next-generation mobile communication system, the aforementioned LCP procedure is basically used, but another procedure may be added or the LCP procedure may be modified and applied.

To perform such an LCP procedure on a resource block (RB)1, RB2 and RB3 based on the LCP procedure is described.

In a Bucket 1 corresponding to the RB1, a token value is infinity and queued data having priority of 1 is 100 bytes. In a Bucket 2 corresponding to the RB2, a token value is 200 bytes, and queued data having priority of 5 is 200 bytes. In a Bucket 3 corresponding to the RB3, a token value is 50 bytes and queued data having priority of 16 is 800 bytes.

If a UL grant of 500 bytes is allocated, an LCP may be performed based on a data size allocated based on the UL grant.

First, in the first step, 100 bytes corresponding to the total data may be selected from the queued data corresponding to the Bucket1 having the highest priority based on the corresponding token value. 100 bytes may be selected from the queued data corresponding to the Bucket2 having next priority based on the corresponding token value. 50 bytes may be selected from the queued data corresponding to Bucket 3 having next priority based on the corresponding token value. The capacity of the occupied data selected as described above is 250 bytes, and the space of 250 bytes may remain in the entire UL grant.

A token value related to each bucket may be subtracted in accordance with the amount of data selected in each bucket. Accordingly, a procedure for LCP may be performed based on a token value subtracted in a subsequent queuing selection process.

In the second step, first, in the case of the Bucket1 having the highest priority in the first process, data is not selected because there is no remaining data, and data of 100 bytes is selected from the queued data corresponding to the Bucket2 having next priority based on the corresponding token value. When data is selected from the queued data corresponding to the Bucket 3 having next priority, data of 150 bytes may be selected based on the remaining space of the UL grant because the queued data corresponding to other buckets having high priority has all been selected.

Queued data corresponding to each bucket may be selected as described above and may be positioned in an allocated UL grant, and the UL grant may be transmitted. Upon transmission, queued data positioned in the same bucket may be contiguously positioned and transmitted as shown in a drawing at the bottom.

Further, when the LCP procedure is performed, the following factors may be sequentially taken into consideration, but the present disclosure is not so limited.
  A MAC control element (MACCE) for data from a C-radio network temporary identifier (RNTI) or a UL-common control channel (CCCH);
  An MACCE for a BSR other than a BSR included for padding;
  AN MACCE for a power headroom report (PHR), an extended PHR or a dual connectivity PHR;
  Data from any logical channel other than data from a UL-CCCH; and
  An MACCE for a BSR included for padding.

Figure 8:
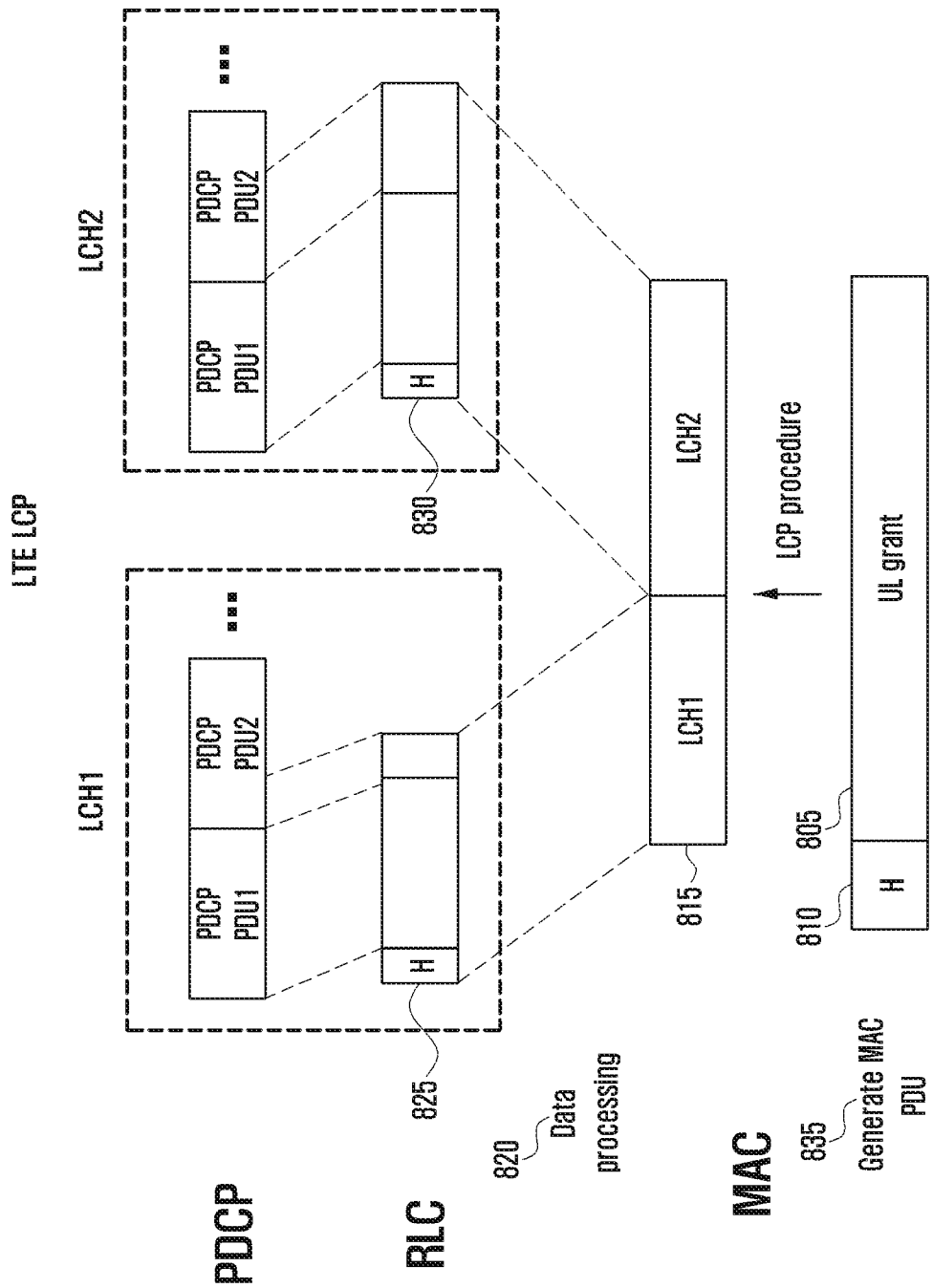
FIG. 8 is a diagram of a procedure for a UE to perform an LCP procedure and to configure a medium access control packet data unit (MAC PDU) corresponding to an uplink (UL) transmission resource in the LTE system, according to an embodiment.

FIG. 8 is a diagram of a procedure for a UE to perform an LCP procedure and to configure a MAC PDU corresponding to an UL transmission resource in the LTE system, according to an embodiment.

Referring to FIG. 8, when the UE receives a UL transmission resource (e.g., UL grant) 805, it may perform an LCP procedure 815 on the size of the remaining UL transmission resource other than a resource space 810 to be occupied by a MAC header. The LCP procedure 815 may comply with the procedure described in FIG. 7 or a modified procedure thereof. The UE may determine a transmission resource to be allocated to each logical channel based on the results of the LCP procedure 815. When a MAC layer device notifies an RLC layer device, corresponding to each logical channel, of the size of the transmission resource determined as the results of the LCP procedure 815 for each logical channel, the UE may perform data processing 820.

The data processing may be performed on each of the logical channels. The PDCP layer device configures PDCP PDUs and delivers them to the RLC layer device. The RLC layer device configures one RLC SDU by concatenating or segmenting the PDCP PDUs based on the size of the transmission resource received from the MAC layer device. The RLC layer device generates an RLC PDU by configuring two RLC headers 825, 830 and delivers them to the MAC layer device. The MAC layer device receives the RLC PDUs for each logical channel, and generates a MAC PDU based on the size of the UL transmission resource by configuring corresponding MAC sub-headers 835.

Figure 9:
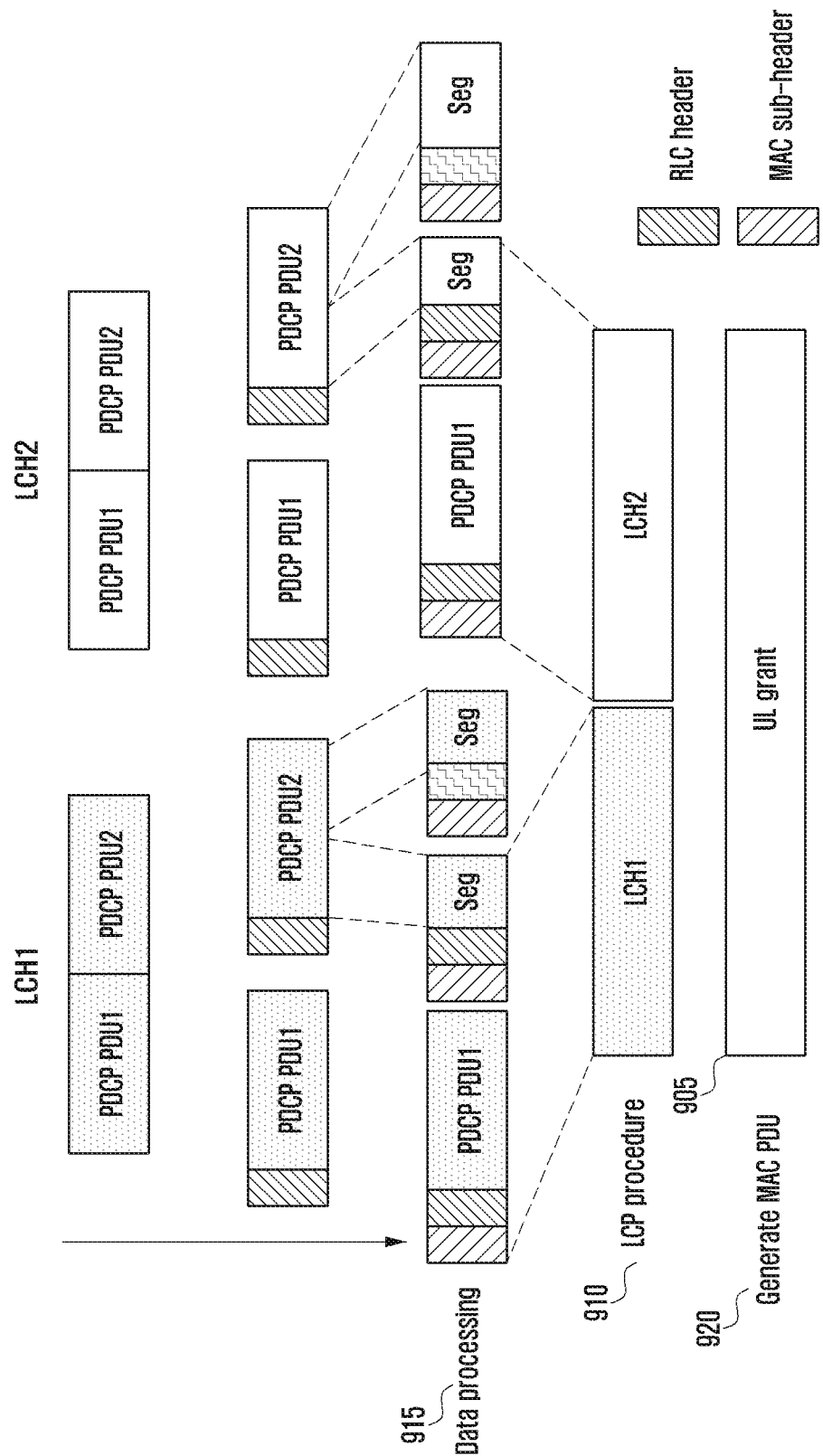
FIG. 9 is a diagram of a procedure for a UE to perform an LCP procedure and to configure a MAC PDU corresponding to a UL transmission resource in a next-generation mobile communication system in which data pre-processing has not been implemented, according to an embodiment.

FIG. 9 is a diagram of a procedure for a UE to perform an LCP procedure and to configure a MAC PDU corresponding to a UL transmission resource in a next-generation mobile communication system in which data pre-processing has not been implemented, according to an embodiment.

Referring to FIG. 9, when the UE receives a UL transmission resource (e.g., UL grant) 905, it may perform an LCP procedure on the size of the remaining UL transmission resource other than a resource space to be occupied by a MAC header or may perform an LCP procedure on the entire size. The LCP procedure may comply with the procedure described in FIG. 7 or a modified procedure thereof. The UE may determine a transmission resource to be allocated to each logical channel based on the results of the LCP procedure 910.

When a MAC layer device notifies an RLC layer device, corresponding to each logical channel of the size of a transmission resource determined as the results of the LCP procedure for each logical channel, the UE may perform data processing 915. The data processing may be performed on each logical channel. A PDCP layer device configures a PDCP PDU and delivers it to an RLC layer device. The RLC layer device configures an RLC header for each PDCP PDU and delivers it to a MAC layer device. The MAC layer device generates a MAC sub-header and MAC SDU by configuring the MAC sub-header. The size of the generated MAC sub-headers and MAC SDUs is configured to be suitable for the size of the transmission resource received from the MAC layer device. If a segmentation operation is necessary because the size of the transmission resource is not sufficient, the RLC layer device performs a segmentation operation, newly configures the RLC header of each segmented data (or segment), delivers it to the MAC layer device so that the size of generated MAC sub-headers, and MAC SDUs is configured to be suitable for the size of the transmission resource 915. In this case, regarding a specific PDCP PDU, the RLC layer may configure an RLC header for the specific PDCP PDU based on the size of a transmission resource from the MAC layer by taking into consideration the size of the transmission resource, and may deliver the RLC header to the MAC layer.

The MAC layer may directly generate a MAC sub-header and MAC SDU by configuring the MAC sub-header. Alternatively, the RLC layer may configure an RLC header suitable for each segmented data (or segment) by performing a segmentation operation on a specific PDCP PDU (e.g., may perform an operation of updating an SI field or adding an SO field), and may deliver each segmented data to the MAC layer. The MAC layer may generate each MAC sub-header and MAC SDU. The MAC layer device generates a MAC PDU 920 suitable for the size of the UL transmission resource using the MAC sub-headers and MAC SDUs generated for each logical channel.

Figure 10:
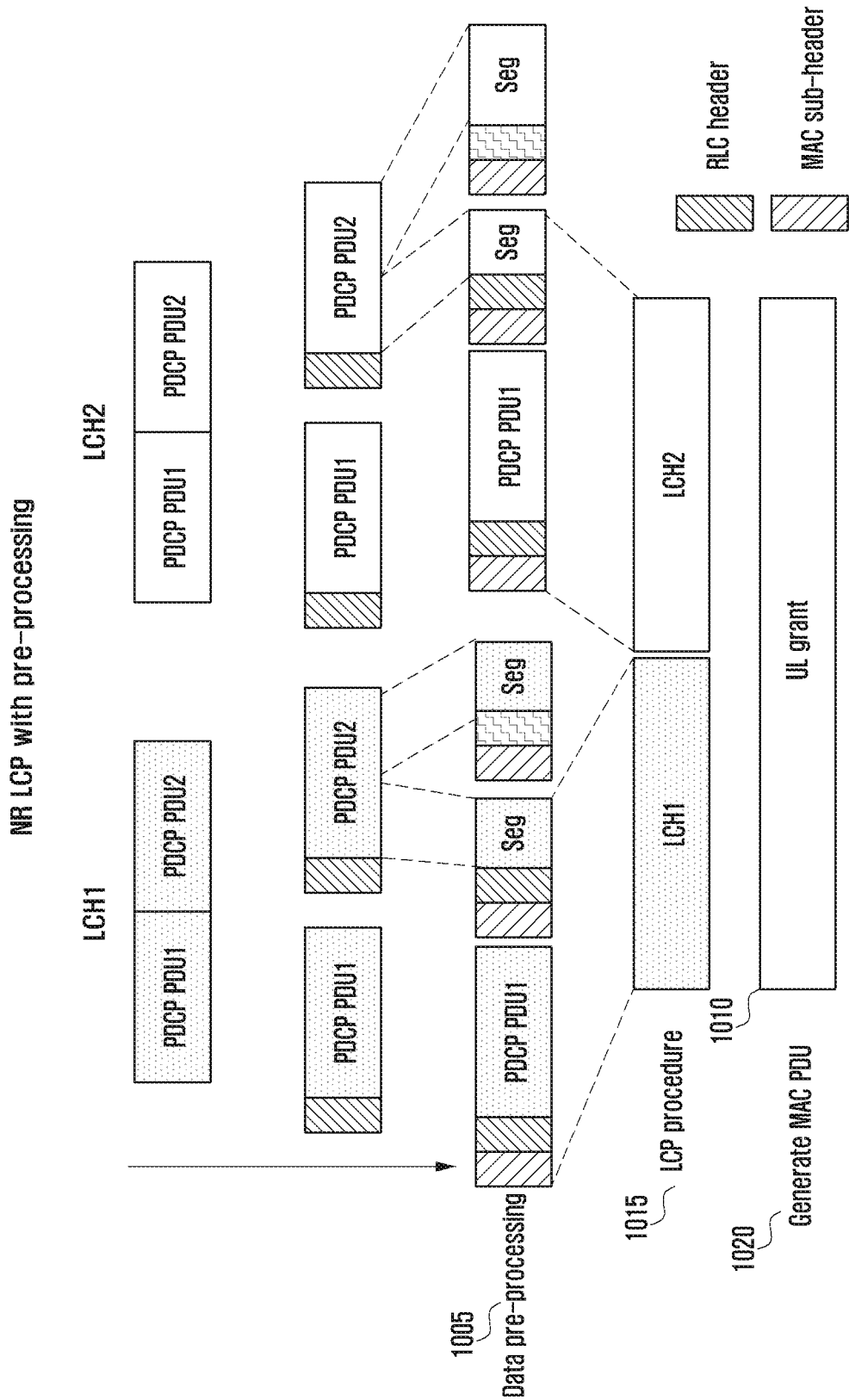
FIG. 10 is a diagram of a procedure for a UE to perform an LCP procedure and to configure a MAC PDU corresponding to a UL transmission resource in a next-generation mobile communication system in which data pre-processing has been implemented, according to an embodiment.

FIG. 10 is a diagram of a procedure for a UE to perform an LCP procedure and to configure a MAC PDU corresponding to a UL transmission resource in a next-generation mobile communication system in which data pre-processing has been implemented, according to an embodiment.

Referring to FIG. 10, the UE may perform a data pre-processing procedure 1005 before it receives a UL transmission resource (e.g., UL grant) 1010. In each logical channel, a PDCP layer device may have configured a PDCP PDU and delivered it to an RLC layer device. The RLC layer device may have configured an RLC header and delivered it to a MAC layer device. The MAC layer device may have generated a MAC sub-header and a MAC SDU 1005.

When the UE receives a UL transmission resource (e.g., UL grant) 1010 after the data pre-processing, the UE may perform an LCP procedure 1015 on the size of the remaining UL transmission resource other than a resource space to be occupied by a MAC header or may perform the LCP procedure 1015 on the entire size. The LCP procedure 1015 may comply with the procedure described in FIG. 7 or a modified procedure thereof. The UE may determine a transmission resource for each logical channel as the results of the LCP procedure 1015. When the size of the transmission resource corresponding to each logical channel is determined as the results of the LCP procedure 1015, the MAC layer device may check the size of the data pre-processed MAC sub-headers and MAC SDUs for each logical channel, and may configure a MAC PDU suitable for the size of the transmission resource.

If the size of the transmission resource is not sufficient, the MAC layer device may perform a segmentation operation on the data pre-processed MAC sub-headers and MAC SDUs. The segmentation operation is performed in the RLC layer. An RLC header may be newly configured with respect to segmented data (or segment) (e.g., an operation of updating an SI field or adding an SO field may be performed). The MAC sub-header may be newly configured with respect to the segmented data (or segment) (e.g., the L field value of the MAC sub-header may be updated because the size of the RLC PDU has changed).

The size of the MAC sub-headers and MAC SDUs determined from each of the logical channels is configured to be suitable for the size of the transmission resource determined in the LCP procedure 1015 of the MAC layer device. A MAC PDU 1020 is generated based on the configured size.

In the LTE system or a next-generation mobile communication system, an environment in which a UE receives a plurality of UL transmission resources (e.g., UL grants) is taken into consideration. With respect to the plurality of UL transmission resources, an ENB may allocate a plurality of different frequency resources to the UE with respect to the same time resource, and may allocate a plurality of the same or different frequency resources to the UE with respect to different resources.

When the plurality of UL transmission resources is received, the UE may configure a plurality of MAC PDUs to be transmitted through the UL transmission resources. Accordingly, the UE may perform an LCP procedure on each of the UL transmission resources as described with reference to FIGS. 7 to 10, and may generate a MAC PDU based on the results of the LCP procedure.

However, as described with reference to FIG. 7, the LCP procedure has a slightly complicated structure and requires a great computational load. Basically, each logical channel needs to calculate and update each token value every TTI. When a UL transmission resource is allocated by an ENB, in the first step of the two-step procedure, a resource corresponding to the token value of each logical channel needs to be allocated based on priority. In the second step of the two-step procedure, any remaining transmission resource, if any, needs to be allocated to each logical channel based on priority until the buffer value of each logical channel is empty or the entire UL transmission resource is exhausted, and the size of the transmission resource needs to be indicated for each logical channel. When a UE receives a plurality of UL transmission resources, the UE needs to perform an LCP procedure on each of the UL transmission resources. Accordingly, a UE processing burden may be greatly increased.

A method of performing an LCP procedure on a plurality of UL transmission resources having the same numerology or TTI (or UL transmission resources having the same group of logical channels to which the UL transmission resource can be distributed) and of configuring a plurality of MAC PDUs to be transmitted using the plurality of UL transmission resources is provided herein.

Figure 11:
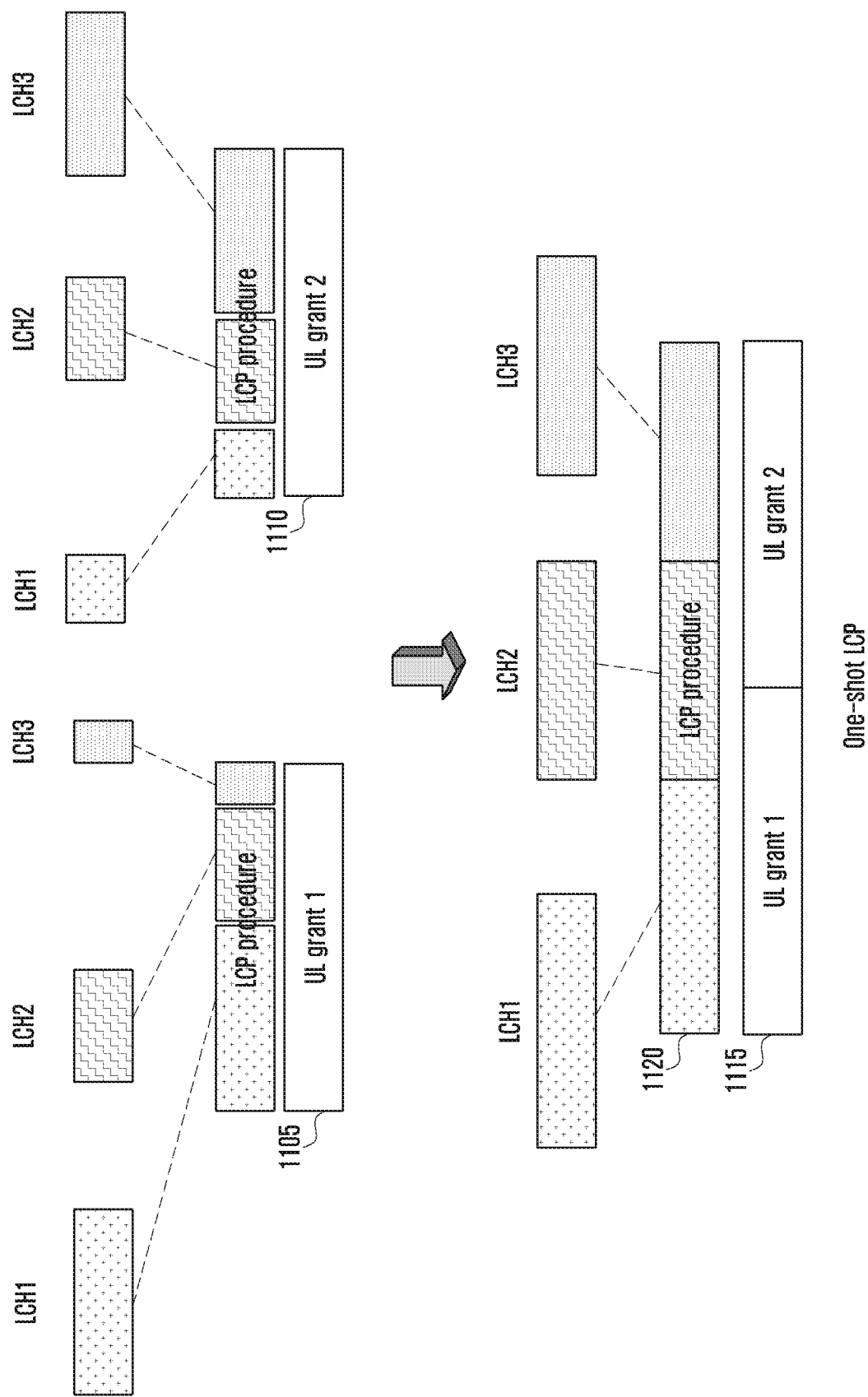
FIG. 11 is a diagram of a method of applying an LCP procedure (one-shot LCP), according to an embodiment.

FIG. 11 is a diagram of a method of applying an LCP procedure (one-shot LCP), according to an embodiment.

Referring to FIG. 11, when a UE receives two UL transmission resources (e.g., UL grant 1 and UL grant 2) having the same numerology or TTI (or two UL transmission resources having the same group of logical channels to which the two UL transmission resources may be distributed), the UE may perform an LCP procedure on each of the UL transmission resources, and may distribute the UL transmission resources to logical channels based on each UL transmission resource 1105, 1110. The UE needs to perform the LCP procedure twice. If the LCP procedure is performed in series twice as described above, a computational load is increased and the number of segments is increased. As a result, a computational load may be increased in the LCP procedure of a transmitting stage, and a computational load may be increased in a procedure of merging segments in a receiving stage.

In the method of applying an LCP procedure, an LCP procedure 1120 (i.e., one-shot LCP procedure) is performed on the total size of the two UL transmission resources 1105, 1110 having the same numerology or TTI (or two UL transmission resources having the same group of logical channels to which the two UL transmission resource may be distributed) only once (illustrated by reference number 1115). That is, one LCP procedure 1120 may be performed, and transmission resources may be distributed to logical channels at once based on the sum of the sizes of the two UL transmission resources having the same numerology or TTI (or two UL transmission resources having the same group of logical channels to which the two UL transmission resource may be distributed) and the size of all UL transmission resources to the logical channels. An example in which an LCP procedure is applied to the transmission data of logical channels based on the total size of a plurality of UL resources and TTI of which is the same may be taken into consideration.

If the LCP procedure is simply performed only once and the transmission resources are distributed to the logical channels based on the size of all the UL transmission resources as described above, however, a MAC PDU suitable for the size of each transmission resource may not be configured. That is, if a transmission resource is allocated to each logical channel and data suitable for each logical channel is configured as in the LCP procedure 1120, the data configured for each logical channel may not be suitable for the size of a MAC PDU to be transmitted in a first UL transmission resource (e.g., UL grant 1) and a second UL transmission resource (e.g., UL grant 2) (that is, a segmentation operation may need to be performed again). In contrast, if an LCP procedure is performed on each UL transmission resource 1105 and 1110, a MAC PDU suitable for a corresponding UL transmission resource can be directly configured and transmitted if data has only to be configured based on the size of a transmission resource distributed to each logical channel.

Accordingly, in order to apply an LCP procedure to a plurality of UL transmission resources only once, an efficient method of configuring a plurality of MAC PDUs needs to be involved after an LCP procedure is applied.

A method of efficiently configuring a plurality of MAC PDUs after applying an LCP procedure to a plurality of UL transmission resources once is now described.

Figure 12:
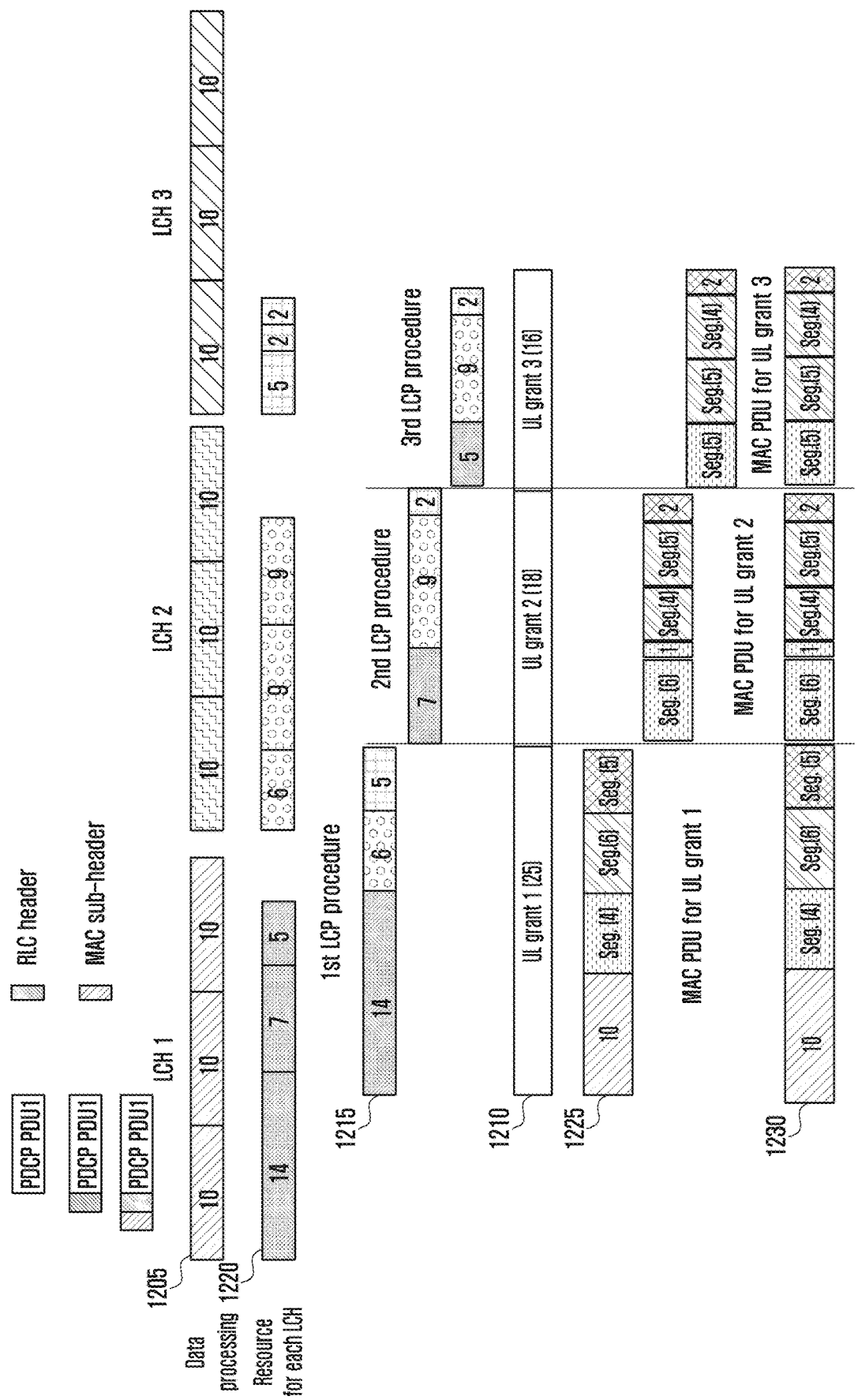
FIG. 12 is a diagram of a plurality of UL transmission resources that have been assigned to a UE, and the UE distributes the transmission resources for each logical channel by performing an LCP procedure and configures a MAC PDU for each UL transmission resource, according to an embodiment.

FIG. 12 is a diagram in which a plurality of UL transmission resources is assigned to a UE and the UE distributes the transmission resources for each logical channel by performing an LCP procedure and configures a MAC PDU for each UL transmission resource, according to an embodiment.

Referring to FIG. 12, it is assumed that a UE has three logical channels, for convenience of description, and a data size unit of each logical channel is indicated as an integer. The size unit of the data may be a byte or a K type or a random unit indicative of the size of data. A data unit 1205 is indicated as a rectangle block in FIG. 12. The priority of the three logical channels may be assumed to be "logical channel 1>logical channel 2>logical channel 3." In FIG. 12, the rectangle blocks of each logical channel, such as data unit 1205, may indicate an RLC PDU (with respect to FIG. 8) or MAC sub-header generated after a UL transmission resource is received and an LCP procedure is performed, as described with reference to FIG. 8, 9, or 10, or a MAC SDU (with respect to FIG. 9) corresponding to the RLC PDU or MAC sub-header. The rectangle blocks of each logical channel may indicate a data pre-processed MAC sub-header before a UL transmission resource is received and a MAC SDU corresponding to the MAC sub-header, as described with reference to FIG. 10.

The UE may receive three UL transmission resources (e.g., UL grant 1, UL grant 2, and UL grant 2) 1210 at least one of the numerology and TTI of which is the same (or three UL transmission resources having the same group of logical channels to which the three UL transmission resources may be distributed)). With respect to the plurality of UL transmission resources, an ENB may allocate a plurality of different frequency resources to the UE with respect to the same time resource, and may allocate a plurality of the same or different frequency resources to the UE with respect to different resources.

The UE may perform an LCP procedure 1215 on each of the received three UL transmission resources. The UE may individually perform the LCP procedure three times. The UE may perform the LCP 1215 procedure on the first UL transmission resource 1210 (e.g., UL grant 1), may determine a transmission resource to be distributed to each logical channel, and may notify each logical channel of the determined transmission resource 1220. When the transmission resource is distributed, each logical channel may process and configure data based on the transmission resource e.g., data unit 1205, and may configure a MAC PDU based on the data configured for each logical channel 1225. If the transmission resource is not sufficient, each logical channel 1225 may configure transmission data suitable for the transmission resource by performing a segmentation operation.

If a resource remained after data on which a segmentation operation has not been performed is configured as much as possible based on a transmission resource is smaller or less than a given size (e.g., x byte), each logical channel may put data configured without performing a segmentation operation, that is, data configured by giving up the remaining transmission resource (i.e., data on which a segmentation operation has not been performed), into a MAC PDU configuration. The given size (e.g., x byte) may be a preset value or a value set by an ENB. The UE may determine the given size "x" based on information received from the ENB.

Data is not added by performing a segmentation operation when the size of a transmission resource remained before the segmentation operation is performed is a less than the given size. If the given size is less or equal to (or slightly greater than) the total sum or the sum of some of PDCP headers or RLC headers or MAC sub-headers, actual data is not included in the transmission resource and only a header may be added although the segmentation operation is performed.

Such a procedure may be repeatedly applied to the second UL transmission resource (e.g., UL grant 2) and the third UL transmission resource (e.g., UL grant 3). As a result, the LCP procedure 1215 is performed three times, the segmentation operation is performed nine times, and 12 segmented data (or segments) is included in a total of three MAC PDUs.

When a MAC PDU is configured after data to be transmitted is delivered from each logical channel, if any logical channel has configured and delivered data having a size less than the size of a distributed transmission resource, a transmission resource may remain.

The UE may transmit the remaining transmission resource by adding padding to it. Alternatively, if the size of the remaining transmission resource is less than a given size (e.g., y byte), the UE may configure processed data by adding padding to it. If the size of the remaining transmission resource is greater than the given size, the UE may request the addition of a data configuration to a logical channel having the highest priority or a given logical channel, and may configure processed data by adding the data configuration to a MAC PDU. The given size of y bytes may be a preset value or a value set by an ENB. The UE may determine the given size "y" based on information received from the ENB.

The procedure may be performed in at least one of the RLC layer device and the MAC layer device.

Figure 13:
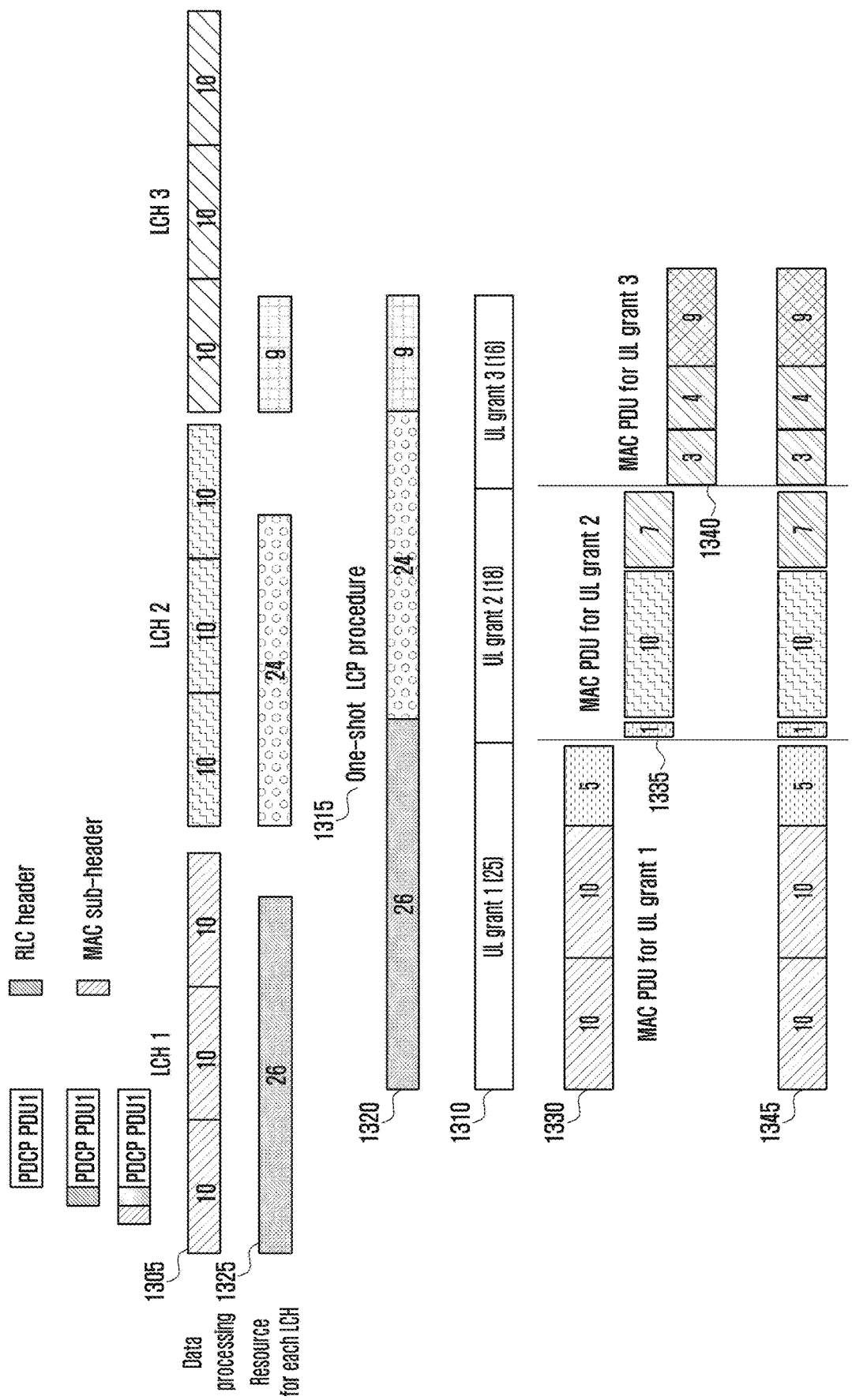
FIG. 13 is a diagram of a plurality of UL transmission resources that have been assigned to a UE and the UE distributes the transmission resources for each logical channel by performing an LCP procedure and configures a MAC PDU for each UL transmission resource, according to an embodiment.

FIG. 13 is a diagram of a plurality of UL transmission resources assigned to a UE and the UE distributes the transmission resources for each logical channel by performing an LCP procedure and configures a MAC PDU for each UL transmission resource, according to an embodiment.

Referring to FIG. 13, it is assumed that a UE has three logical channels, and a data size unit of each logical channel is indicated as an integer. The size unit of the data may be a byte or a K type or a random unit indicative of the size of data. A data unit 1305 is indicated as a rectangle block in FIG. 13. The priority of the three logical channels may be assumed to be "logical channel 1>logical channel 2>logical channel 3." In FIG. 13, the rectangle blocks of each logical channel, such as data unit 1305, may indicate an RLC PDU (with respect to FIG. 8) or MAC sub-header generated after a UL transmission resource is received and an LCP procedure is performed, as described with reference to FIG. 8, 9, or 10, or a MAC SDU (with respect to FIG. 9) corresponding to the RLC PDU or MAC sub-header. The data units 1305, may indicate a data pre-processed MAC sub-header before a UL transmission resource is received and a MAC SDU corresponding to the MAC sub-header, as described with reference to FIG. 10.

The UE may receive three UL transmission resources 1310 (e.g., UL grant 1, UL grant 2, and UL grant 2) at least one of the numerology and TTI of which is the same (or three UL transmission resources having the same group of logical channels to which the three UL transmission resources may be distributed). With respect to the plurality of UL transmission resources 1310, an ENB may allocate a plurality of different frequency resources to the UE with respect to the same time resource, and may allocate a plurality of the same or different frequency resources to the UE with respect to different resources.

The UE may perform an LCP procedure 1315 on the total size of the received three UL transmission resources (i.e., one-shot LCP procedure). The UE may perform the LCP procedure 1315 on the size of all the UL transmission resources once. The UE may perform the LCP procedure 1315 on all the UL transmission resources 1310, may determine a transmission resource to be distributed to each logical channel 1320, and may notify each logical channel of the determined transmission resource 1325.

When the transmission resource is distributed, each logical channel may configure a MAC PDU by taking into consideration the size of the transmission resource and the size of each UL transmission resource. The method of configuring a MAC PDU may be performed according to the following procedure, which may be performed for each logical channel (each logical channel has priority as described with reference to FIG. 7) according to the priority sequence of logical channels (or sequence assigned in an implementation).

The UE fills a random UL transmission resource with data on which a segmentation operation has not been performed as much as possible within the size of the transmission resource distributed to each logical channel 1330. The random UL transmission resource may be selected from a plurality of UL transmission resources by taking into consideration the sequence of a frequency resource or time resource. A sequence regarding that a MAC PDU will be first configured with respect to which UL transmission resource may be determined. If the UL transmission resource is no longer filled with the data on which the segmentation operation has not been performed or if a segmentation operation needs to be performed because the size of a transmission resource distributed to a logical channel is not sufficient, the UE may perform a segmentation operation and fill the UL transmission resource with segmented data.

If the UL transmission resource has been fully filled with data corresponding to the size of the transmission resource distributed to the logical channel, the UE may repeat the procedure on a logical channel of a next sequence by the size of a distributed transmission resource.

If the UL transmission resource is fully filled, a UL transmission resource of a next sequence may be filled with the data of the logical channel up to the size of the transmission resource distributed to the logical channel through the above procedure.

A MAC PDU suitable for the size of each UL transmission resource 1330, 1335 and 1340 may be configured by repeatedly performing such a procedure on each logical channel and each UL transmission resource 1310.

If the transmission resource is not sufficient, data may be configured to be suitable for the transmission resource by performing a segmentation operation. If a resource remained after data having a segmentation operation not performed thereon is configured to be suitable for a transmission resource as much as possible is less than a given size (e.g., x byte), data configured without performing a segmentation operation, that is, data configured by giving up the remaining transmission resource (data on which a segmentation operation has not been performed), may be put into a MAC PDU configuration.

Data is not added by performing a segmentation operation when the size of a transmission resource remained before the segmentation operation is performed is a less than the given size. If the given size is less than or equal to (or slightly greater than) the total sum or the sum of some of PDCP headers or RLC headers or MAC sub-headers, actual data is not included in the transmission resource and only a header may be added although the segmentation operation is performed. The given size of x byte may be a preset value or a value set by an ENB. The UE may determine the given size "x" based on information received from the ENB.

As a result, the LCP procedure 1315 is performed once, the segmentation operation is performed five times, and six segmented data (or segment) is included in a total of three MAC PDUs.

When a MAC PDU is configured after data to be transmitted is delivered from each logical channel, if any logical channel has configured and delivered data having a size less than the size of a distributed transmission resource, a transmission resource may remain. The UE may transmit the remaining transmission resource by adding padding to it. Alternatively, if the size of the remaining transmission resource is less than a given size (e.g., y byte), the UE may configure processed data by adding padding to it. If the size of the remaining transmission resource is greater than the given size, the UE may request the addition of a data configuration to a logical channel having the highest priority or a given logical channel, and may configure processed data by adding the data configuration to a MAC PDU. The given size of y bytes may be a preset value or a value set by an ENB. The UE may determine the given size "y" based on information received from the ENB.

The procedure may be performed in the RLC layer device and the MAC layer device.

The configuration pattern of MAC PDUs 1345 corresponds to the plurality of UL transmission resources 1310. When compared with the MAC PDU configuration pattern 1230 of FIG. 12, the configuration pattern of the MAC PDUs 1345 of FIG. 13 is continuously configured in the plurality of MAC PDUs 1345.

Figure 14:
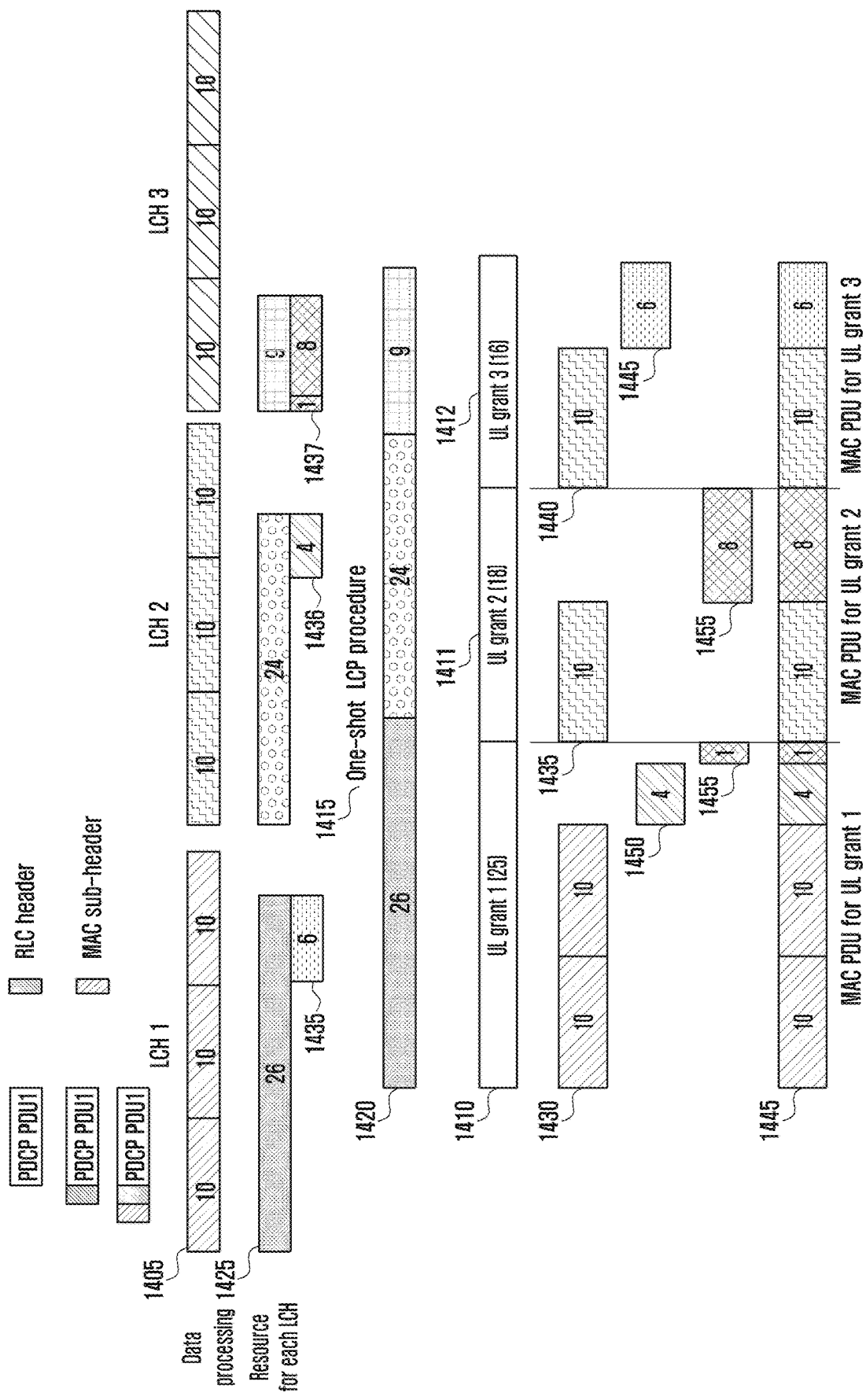
FIG. 14 is a diagram of a UE that receives a plurality of UL transmission resources, distributes the transmission resources for each logical channel by performing an LCP procedure, and configures a MAC PDU for each UL transmission resource, according to an embodiment.

FIG. 14 is a diagram in which a UE receives a plurality of UL transmission resources, distributes the transmission resources for each logical channel by performing an LCP procedure and configures a MAC PDU for each UL transmission resource, according to an embodiment.

Referring to FIG. 14, it is assumed that a UE has three logical channels, and a data size unit of each logical channel is indicated as an integer. The size unit of the data may be a byte or a K type or a random unit indicative of the size of data. A data unit 1405 is indicated as a rectangle block in FIG. 14. The priority of the three logical channels may be assumed to be "logical channel 1>logical channel 2>logical channel 3." In FIG. 14, the rectangle blocks of each data unit 1405, may indicate an RLC PDU (with respect to FIG. 8) or MAC sub-header generated after a UL transmission resource is received and an LCP procedure is performed, as described with reference to FIG. 8, 9, or 10, or a MAC SDU (with respect to FIG. 9) corresponding to the RLC PDU or MAC sub-header. The data units 1405 may indicate a data preprocessed MAC sub-header before a UL transmission resource is received and a MAC SDU corresponding to the MAC sub-header, as described with reference to FIG. 10.

The UE may receive three UL transmission resources 1410 (e.g., UL grant 1, UL grant 2, and UL grant 2) at least one of the numerology and TTI of which is the same (or three UL transmission resources having the same group of logical channels to which the three UL transmission resources may be distributed)). With respect to the plurality of UL transmission resources, an ENB may allocate a plurality of different frequency resources to the UE with respect to the same time resource, and may allocate a plurality of the same or different frequency resources to the UE with respect to different resources.

The UE may perform an LCP procedure 1415 on the total size of the received three UL transmission resources 1410, 1411, and 1412 (i.e., one-shot LCP procedure). The UE may perform the LCP procedure 1415 on the size of all the UL transmission resources 1410, 1411, and 1412 once. The UE may perform the LCP procedure 1415 on all the UL transmission resources 1410, 1411 and 1412, may determine a transmission resource to be distributed to each logical channel 1420, and may notify each logical channel of the determined transmission resource 1425.

When the transmission resource is distributed, each logical channel 1420 may configure a MAC PDU by taking into consideration the size of the transmission resource and the size of each UL transmission resource 1410, 1411, and 1412. The method of configuring a MAC PDU may be performed according to the following procedure.

First step: data is allocated to a UL transmission resource without a segmentation operation.

Each logical channel 1420 does not perform a segmentation operation within a transmission resource distributed to each logical channel 1420 in the priority sequence of the logical channels (or in sequence assigned in an implementation), and fills each UL transmission resource 1410, 1411, and 1412 with data in sequence without exceeding the size of the UL transmission resources 1410, 1411, and 1412. The procedure is performed for each logical channel 1420, and is performed in the predetermined sequence for each logical channel 1420 until the UL transmission resources 1410, 1411, and 1412 cannot be filled with data even without performing a segmentation operation.

Which one of a plurality of UL transmission resources 1410, 1411, and 1412 will be first filled may be predetermined. For example, the UL transmission resources 1410, 1411, and 1412 will be filled in order of greater size. Alternatively, the sequence of the UL transmission resources 1410, 1411, and 1412 will be determined in smaller sequence, in sequence assigned in an implementation or by taking into consideration a time resource and a frequency resource.

If data can be no longer allocated to a UL transmission resource 1410, 1411, and 1412 without a segmentation operation in a specific logical channel in the first step, a second step is performed.

Second step: allocate segmented data to the UL transmission resources by performing a segmentation operation.

For a logical channel whose distributed transmission resource remains after data is allocated to the UL transmission resources 1410, 1411, and 1412 in the first step in the priority sequence of the logical channels (or in sequence assigned in an implementation) for each logical channel 1420, the size of the transmission resource now remained in the logical channel is compared with the size of each remaining UL transmission resources 1410, 1411, and 1412. A next step is checked before a segmentation operation is performed for each logical channel 1420, and the segmentation operation is performed.

If the size of the transmission resource remained in the logical channel is less than the size of a transmission resource remained in a specific UL transmission resource, and the number of such UL transmission resources is plural, a UL transmission resource belonging to the UL transmission resources and having the smallest size of remaining transmission resource is filled with the segmented data of the logical channel (by performing the segmentation operation on data based on the size of the transmission resource remained in the logical channel). The reason why a UL transmission resource belonging to the UL transmission resources and having the smallest size of the remaining transmission resource is filled in sequence is to efficiently use the transmission resources as much as possible and to minimize the number of segmented data.

If the size of the transmission resource remained in the logical channel is greater than the size of a transmission resource remained in a specific UL transmission resource, and the number of such UL transmission resources is plural, the sizes of remaining transmission resources in the UL transmission resources 1410, 1411, and 1412 are added in order of greater size, and a UL transmission resource is selected so that the sum is greater than or equal to the size of the transmission resource remained in the logical channel. Segmented data is configured and each of the selected UL transmission resources 1410, 1411, and 1412 is filled with the segmented data by performing a data segmentation operation based on the size of the transmission resource remained in the logical channel, but performing the segmentation operation so that the selected UL transmission resource is filled with the segmented data. The reason why a UL transmission resource belonging to the UL transmission resources and having the greatest size of the remaining transmission resource is filled in sequence is to efficiently use the transmission resources as much as possible and to minimize the number of segmented data.

In the first step, if it is expected that a segmentation operation needs to be first performed, the segmentation operation may be immediately performed on the first case only (this is a method of reducing a UE processing time by performing segmentation operations in parallel while performing the first step, and this method uses the fact that a UL transmission resource 1410, 1411, and 1412 to be filled with first segmented data always remains). For the second case, a segmentation operation needs to be performed by taking one of the UL transmission resources 1410, 1411, and 1412 into consideration in the second step.

An example in which a plurality of MAC PDUs is configured through the proposed two-step procedure is shown in FIG. 14.

As described above, the LCP procedure 1415 is performed on the total size of the UL transmission resources 1410, 1411 and 1412, and each logical channel 1420 is notified of the size of a transmission resource for each logical channel 1420 distributed based on the results of the LCP procedure 1415 (as illustrated by reference numbers 1420, 1425). Furthermore, the UL transmission resources 1410, 1411, and 1412 start to be filled with data from a logical channel having high priority (or in sequence assigned by an implementation). As described above, it is assumed that priority of the logical channels is logical channel 1>logical channel 2>logical channel 3.

Accordingly, a procedure of filling the UL transmission resources 1410, 1411, and 1412 with data from the logical channel 1 without the segmentation operation of the first step is performed. For example, 26 is the size of a distributed transmission resource that has been assigned to the logical channel 1. It may be seen that in the logical channel 1 (e.g., when the data includes a MAC sub-header and a MAC SDU), one of the UL transmission resources 1410, 1411, and 1412 may be filled with up to two data, each one having a data size of 10 (the data size is variable, but the data is assumed to have the size of 10 for convenience of description). Accordingly, in the logical channel 1, a UL transmission resource starts to be filled with the two data, each one having the size of 10. When the UL transmission resource is filled with the data, a UL transmission resource belonging to the plurality of UL transmission resources 1410, 1411, and 1412 and having the greatest size of a transmission resource is first filled. The reason for this is that the data of a channel having high priority is quickly processed in a receiving stage by putting the data in sequence as much as possible.

In the logical channel 1, the UL transmission resource 1 1410 is filled with the two data, each one having the data size 10, in sequence. In the logical channel 1, in order to further fill the UL transmission resource 1 with data, since 20 of 26 of the transmission resource has been used and the size of the remaining data is 10, a segmentation operation needs to be performed because only 6 has remained. Accordingly, the first step can be no longer performed, and the first step is performed in the logical channel 2 of a next sequence. One of the UL transmission resources may be filled with two data because the size of a transmission resource distributed to the logical channel 2 is 24 (e.g., when the data includes a MAC sub-header and a MAC SDU) and the data has a size of 10. 5 remains in the UL transmission resource 1 1410, 18 remains in the UL transmission resource 2 1411, and 16 remains in the UL transmission resource 3 1412. Accordingly, in order to fill the UL transmission resources 1410, 1411, and 1412 with data without performing a segmentation operation, each of the UL transmission resource 2 1411 and the UL transmission resource 3 1412 may be filled with data having a size of 10 (as illustrated by reference numbers 1435, 1440).

In the logical channel 2, a segmentation operation needs to be performed because only 4 has remained because 20 of 24 of the distributed transmission resource has been used and the size of the remaining data is 10. Accordingly, the first step can be no longer performed, and the first step is performed in the logical channel 3 of a next sequence. In the logical channel 3, the UL transmission resources 1410, 1411, and 1412 cannot be filled with data without performing a segmentation operation because the size of the distributed transmission resource is 9 and the size of data is 10 (e.g., when the data includes a MAC sub-header and a MAC SDU).

The second step is performed based on whether the first step has been confirmed and the first step has been performed.

In the second step, an operation is performed from a logical channel having high priority (or in sequence assigned by an implementation). Data having a size of 6 needs to be segmented from the data having the size of 10 by performing a segmentation operation because 20 of the transmission resource 26 distributed to the logical channel 1 has been used and 6 has remained. However, the size of the UL transmission resource needs to be first confirmed before the segmentation operation is performed. 5 has remained in the UL transmission resource 1 1410, 8 has remained in the UL transmission resource 2 1411, and 6 has remained in the UL transmission resource 3 1412. In the case of the logical channel 1, the segmentation operation is performed because there is a UL transmission resource that may be immediately filled with segmented data when the data is segmented by the size of the remaining transmission resource.

Furthermore, a UL transmission resource belonging to the UL transmission resources 1410, 1411, and 1412 and having the smallest size of a transmission resource is first filled with segmented data. The UL transmission resource 3 1412 that belongs to the UL transmission resource 2 1411 and UL transmission resource 3 1412 capable of being filled with data having the size of 6 when segmentation is performed and that has a smaller size of the remaining transmission resource is filled with the segmented data (having the size of 6) of the logical channel 1 (1445).

Accordingly, the transmission resource distributed to the logical channel 1 has been fully exhausted by performing the second step on the logical channel 1. The second step is then performed on the logical channel 2 of a next sequence. A segmentation operation needs to be performed because 4 of the transmission resources 24 distributed to the logical channel 2 has remained and data has the size of 10. The size of the remaining UL transmission resource 1410, 1411, and 1412 is confirmed before the segmentation operation is performed. The UL transmission resources 1 and 2 1410, 1411 may be filled with the remaining transmission resource of the logical channel 2 because, 5 has remained in the UL transmission resource 1 1410, 8 has remained in the UL transmission resource 2 1411, and 0 has remained in the UL transmission resource 3 1412. Accordingly, the segmentation operation is performed, and the UL transmission resource 1 1410 having the remaining transmission resource of a smaller size is filled with the segmented data (having the size of 4) of the logical channel 2 (as illustrated by reference number 1450).

The second step is performed on the logical channel 3 of the last sequence. A segmentation operation needs to be performed on the logical channel 3 because 9 of the distributed transmission resource remains and data has the data size of 10. The size of the remaining UL transmission resources 1410, 1411, and 1412 is confirmed before the segmentation operation is performed. Any of the UL transmission resources 1410, 1411, and 1412 that cannot be filled with the segmented data of the logical channel 3 having the size 9 because 1 has remained in the UL transmission resource 1 140, 8 has remained in the UL transmission resource 2 1411, and 0 has remained in the UL transmission resource 3 1412.

The size of the transmission resource remained in the logical channel is greater than the size of a transmission resource remained in any of the UL transmission resources 1410, 1411, and 1412. Accordingly, the sizes of the remaining UL transmission resources 1410, 1411, and 1412 are added in sequence of greater transmission resources, and a UL transmission resource greater than the size of the transmission resource remained in the logical channel 3 is selected. If the sizes of the transmission resources remained in the UL transmission resources 1 and 2 1410, 1411 are added to become 9, which is equal to the size of the transmission resource remained in the logical channel 3. Accordingly, when the segmentation operation is performed on the data of the logical channel 3, data having the size of 1 and data having the size of 8 are segmented from the data of the logical channel 3 having the size of 10, and the UL transmission resource 1 1410 and the UL transmission resource 2 1412 are filled with the segmented data, respectively (as illustrated by reference number 1455).

MAC PDUs 1445, each one being suitable for the size of each UL transmission resource, may be configured by performing such a procedure on each logical channel and each UL transmission resource. Furthermore, in an embodiment, each step is for convenience of description, and the size of the finally determined MAC PDU may be said to fall within the scope of right of the present disclosure if it corresponds to the present disclosure although the same step as that described above is not performed.

If the transmission resource is not sufficient, data may be configured to be suitable for the transmission resource by performing a segmentation operation. If a resource remained after data having a segmentation operation not performed thereon is configured to be suitable for a transmission resource as much as possible is less than a given size (e.g., x byte), data configured without performing a segmentation operation, that is, data configured by giving up the remaining transmission resource (data on which a segmentation operation has not been performed) may be put into a MAC PDU configuration. The reason why data is not added by performing a segmentation operation when the size of a transmission resource remained before the segmentation operation is performed is less than the given size is that if the given size is less than or equal to (or slightly greater than) the total sum or the sum of some of PDCP headers or RLC headers or MAC sub-headers, actual data is not included in the transmission resource and only a header may be added although the segmentation operation is performed. The given size of x byte may be a preset value or a value set by an ENB. The UE may determine the given size "x" based on information received from the ENB.

As a result, the LCP procedure 1415 of FIG. 14 is performed once, the segmentation operation is performed three times, and four segmented data (or segments) is included in a total of three MAC PDUs.

When a MAC PDU is configured after data to be transmitted is delivered from each logical channel, if any logical channel has configured and delivered data having a size less than the size of a distributed transmission resource, a transmission resource may remain. In this case, the UE may transmit the remaining transmission resource by adding padding to it. Alternatively, if the size of the remaining transmission resource is less than a given size (e.g., y byte), the UE may configure processed data by adding padding to it. If the size of the remaining transmission resource is greater than the given size, the UE may request the addition of a data configuration to a logical channel having the highest priority or a given logical channel, and may configure processed data by adding the data configuration to a MAC PDU. The given size of y bytes may be a preset value or a value set by an ENB. The UE may determine the given size "y" based on information received from the ENB.

The procedure of FIG. 14 may be performed in the RLC layer device and the MAC layer device.

When compared with the MAC PDU configuration pattern 1230 of FIG. 12, the configuration pattern of the MAC PDUs 1445 of FIG. 14 is different in that in the configuration pattern of the MAC PDUs 1445, data on which a segmentation operation has not been performed is configured from the front part and segmented data is configured in the rear part. Accordingly, if a UE to which a plurality of UL transmission resources has been allocated configures a plurality of MAC PDUs by applying the method of FIG. 14, the configuration pattern of the MAC PDUs 1445 includes data on which a segmentation operation has not been performed from the front part and segmented data is configured in the rear part.

A procedure of applying an LCP procedure to a plurality of UL transmission resources only once may be applied to UL transmission resources having the same numerology or TTI or UL transmission resources belonging to the same group of logical channels to which the UL transmission resource may be distributed as follows.

For example, if a plurality of UL transmission resources is received by a UE, the UE may perform the LCP procedure on UL transmission resources 1, 3 and 5 once and apply the above described MAC PDU configuration method. Furthermore, the UE may perform the LCP procedure on UL transmission resources 2 and 4 once and apply the above described MAC PDU configuration method.

For example:
  UL transmission resource 1 (transmission resources may be distributed to LCH1, LCH2 and LCH3);
  UL transmission resource 2 (transmission resources may be distributed to LCH4, LCH5 and LCH6);
  UL transmission resource 3 (transmission resources may be distributed to LCH1, LCH2 and LCH3);
  UL transmission resource 4 (transmission resources may be distributed to LCH4, LCH5 and LCH6); and
  UL transmission resource 5 (transmission resources may be distributed to LCH1, LCH2 and LCH3).

Which of the above described LCP procedures will be first performed and on which one of the groups of the UL transmission resources 1, 3 and 5 and 2 and 4, and which of the proposed MAC PDU configuration methods will be applied may be determined by taking into consideration the logical channel priority, or numerology or TTI or time resource or frequency resource of the groups or depending on an implementation.

The sequence of data units allocated to the MAC PDUs generated based on the embodiments of FIGS. 12 to 14 may be different from that shown in the drawings. Furthermore, it is evident that the size of a data unit allocated to each UL grant based on an LCP operation according to an embodiment of the specification falls within the scope of right of the present disclosure if it corresponds to an embodiment.

Figure 15:
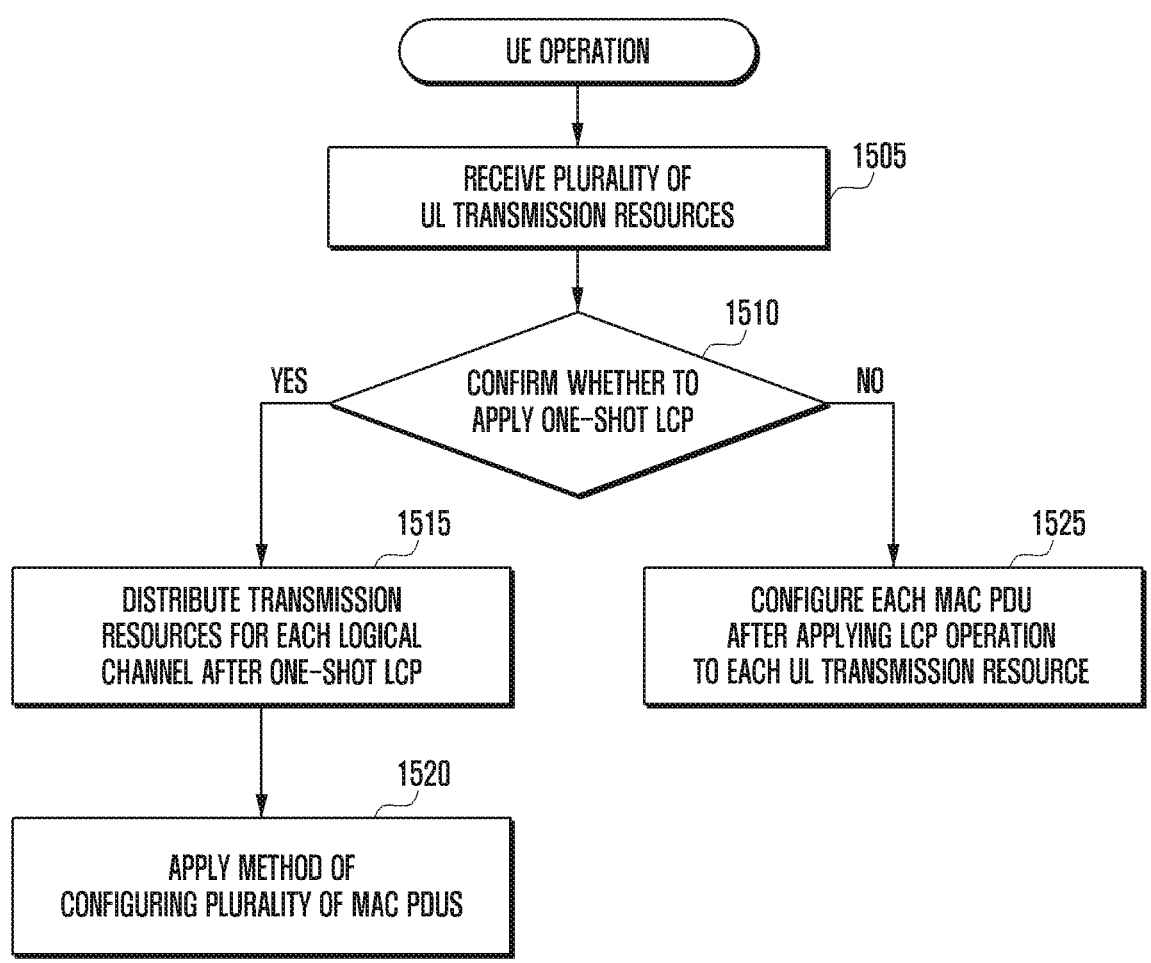
FIG. 15 is a flowchart of a method for performing an LCP application and for configuring a plurality of MAC PDUs, which can be used to process a plurality of UL transmission resources, according to an embodiment.

FIG. 15 is a diagram of a UE operation of performing an LCP application method and a method of configuring a plurality of MAC PDUs, which has been proposed to process a plurality of UL transmission resources, according to an embodiment.

Referring to FIG. 15, the UE may receive information about a plurality of UL transmission resources (at step 1505). The UE may confirm whether there are UL transmission resources on which an LCP procedure can be performed at once (i.e., one-shot LCP) with respect to the plurality of UL transmission resources (at step 1510). That is, the UE confirms and divides UL transmission resources at least one of the numerology and TTI of which is the same or UL transmission resources belonging to the same group of logical channels to which the UL transmission resources may be distributed. If there is a plurality of UL transmission resources to which the LCP procedure may be applied at once, the UE applies the LCP procedure at once and distributes the transmission resources for each logical channel (at step 1515). Furthermore, the UE may configure a plurality of MAC PDUs by applying the second embodiment or third embodiment proposed by the present disclosure based on the distributed logical channel transmission resources (at step 1520). If a plurality of UL transmission resources to which the LCP procedure may be applied at once is not present, the UE applies the LCP procedure to each of the UL transmission resource, distributes a transmission resource to each logical channel, and configures each MAC PDU corresponding to each UL transmission resource (at step 1525). That is, the UE may apply the first embodiment.

An additional method of reducing a UE's processing burden attributable to an LCP procedure is proposed hereinafter. The method of reducing a UE's processing burden attributable to an LCP procedure is as follows.

In the LCP procedures according to FIG. 7, Table 1, and Table 2, the token update procedure of Table 1 is described below. It may be seen that the token value of each logical channel is calculated and updated every TTI (i.e., 1 ms). In order to update the token value, a random LCP time interval may be defined. 1 TTI (e.g., 1 ms) may be allocated to the LCP time interval as in the LCP procedure of the current LTE system, and a greater time value may be assigned to the LCP time interval.

For example, if 10 ms is allocated to the LCP time interval, the token update procedure of Table 1 may not be performed every TTI, but may be performed every 10 TTIs. However, in order to obtain the same calculation results as those every TTI, the update of a token value for all of TTIs needs to be completed when a UL transmission resource is received. Accordingly, the update of a token value may be performed whenever a UL transmission resource is received. For example, if a UL transmission resource has been received after 30 TTIs since a MAC PDU is transmitted through a UL transmission resource, a token value is not updated every TTI for 30 TTIs, but a difference (e.g., 30 TTIs) between a point of time at which a new UL transmission resource is received and a point of time at which a previous UL transmission resource was received is calculated when the new UL transmission resource is received and token values are updated at once by multiplying the calculated difference by a token value added every TTI, thereby being capable of reducing a computational load. Information related to the time interval may be a preset value or may be determined based on information received from an ENB.

When a plurality of efficient MAC PDU configuration methods are applied, the structure of each MAC PDU is configured such that the unpartitioned data (data with MAC SDUs including RLC SDUs not divided), such as the identification number 1445 in FIG. 14, the divided data (data with MAC SDUs including the divided RLC SDUs) are arranged at the rear part. At the last part, MAC CE (control element) and padding can be configured. In the above description, the configuration of the data may include the sequential arrangement of the data described in the embodiment. Such a MAC PDU structure has benefits in both the transmitting and receiving ends in terms of data processing.

As described above, in the transmitter, the pipeline processing (the process of directly processing data from the processed data directly to the serial processing is repeated without interruption) and the parallel data processing are enabled and the number of division operations is reduced and the occurrence of padding can be minimized. On the receiving side, the data divided by the RLC layer device is stored in a buffer for reassembly, and the unprocessed data is directly removed from the header, processed and transmitted to the upper layer. Therefore, in the MAC PDU structure proposed by the disclosure, i.e., when the unpartitioned data is located at the front part and the divided data is located at the rear part, the receiving RLC layer apparatus processes the unpartitioned data that can be directly processed and sent to the upper layer to the upper layer, and to process the divided data to be stored in the buffer in the future, thereby reducing the data processing delay in the receiving side. The non-partitioned data may be allocated to have a lower RLC sequence number than the partitioned data. The RLC serial number assignment can be performed based on whether data is divided or not. In addition, various modified methods of the third embodiment proposed in the present disclosure are possible in order to configure the MAC PDU structure proposed in disclosure, that is, the structure in which the unpartitioned data is located at the front and the divided data is located at the rear part. The MAC PDU structure as shown in the identification number 1445 of FIG. 14, which can improve the data processing speed of the transmitter and the receiver mentioned above, if necessary for MAC CE and after that for padding if necessary.

The procedure for performing the data pre-processing of the disclosure can be applied as follows. In addition, the following data pre-processing method can be applied to at least one of the first embodiment, the second embodiment and the third embodiment proposed in the disclosure.

1. First Embodiment of Data Preprocessing

Each PDCP layer ciphers a PDCP SDU (IP packet or data packet), performs integrity protection if necessary, generates a PDCP header, It is possible to allocate the RLC serial number, set the SI (segmentation information) field, and configure the RLC header to complete the data preprocessing. If an RLC layer device instructs each RLC layer device to meet a predetermined condition in the MAC layer, a length value corresponding to the size of the RLC PDU to process the RLC PDU field, sets an logical channel identifier (LCID) for each RLC layer device, configures a MAC header to construct each MAC subheader and a MAC SDU, and multiplexes the MAC PDU to match the size of the uplink transmission resource. The predetermined condition of the MAC layer may be related to reception of the uplink transmission resource from the base station. More specifically, when the information related to the uplink transmission resource is received by the base station, the base station determines that the condition is satisfied, and may instruct each RLC layer to forward the data preprocessed RLC PDUs to the MAC layer device upon receiving the transmission resource.

2. Second Embodiment of Data Pre-Processing

In the second embodiment of data pre-processing, each PDCP header and each RLC header can be separately generated, stored and managed when the first embodiment of the data pre-processing is performed. That is, each PDCP header and each RLC header can be previously generated, processed, and stored when data pre-processing is performed. If it is necessary to perform the segmentation operation due to lack of transmission resources after receiving the uplink transmission resource, the SI field of the generated RLC header is updated (the first segment face 01, the last segment face 10, the first segment and the last segment), if the segments are not all set to 11. If necessary, the SO field can be dynamically added to the RLC header (if it is not the first segment, a 2-byte size segment offset (SO) field is added and indicated as the offset). The updating of the SI field and the addition of the SO field may be performed together, or may be performed respectively.

3. Third Embodiment of Data Pre-Processing

In the third embodiment of the data pre-processing, the first embodiment of the data pre-processing is performed before the uplink transmission resources are received (allocated). At this time, each PDCP header, each RLC header, and each MAC header can be separately generated, stored, and managed. That is, when data pre-processing is performed, each PDCP header, each RLC header, and each MAC header may be generated in advance, processed separately, and stored. If it is necessary to perform the segmentation operation due to lack of transmission resources after receiving the uplink transmission resource, the SI field of the generated RLC header is updated (the first segment face 01, the last segment face 10, the first segment and the last segment), if the segments are set to 11. If necessary, the SO field can be dynamically added to the RLC header (if it is not the first segment, a 2-byte size segment offset (SO) field is added and indicated the offset).

Figure 16:
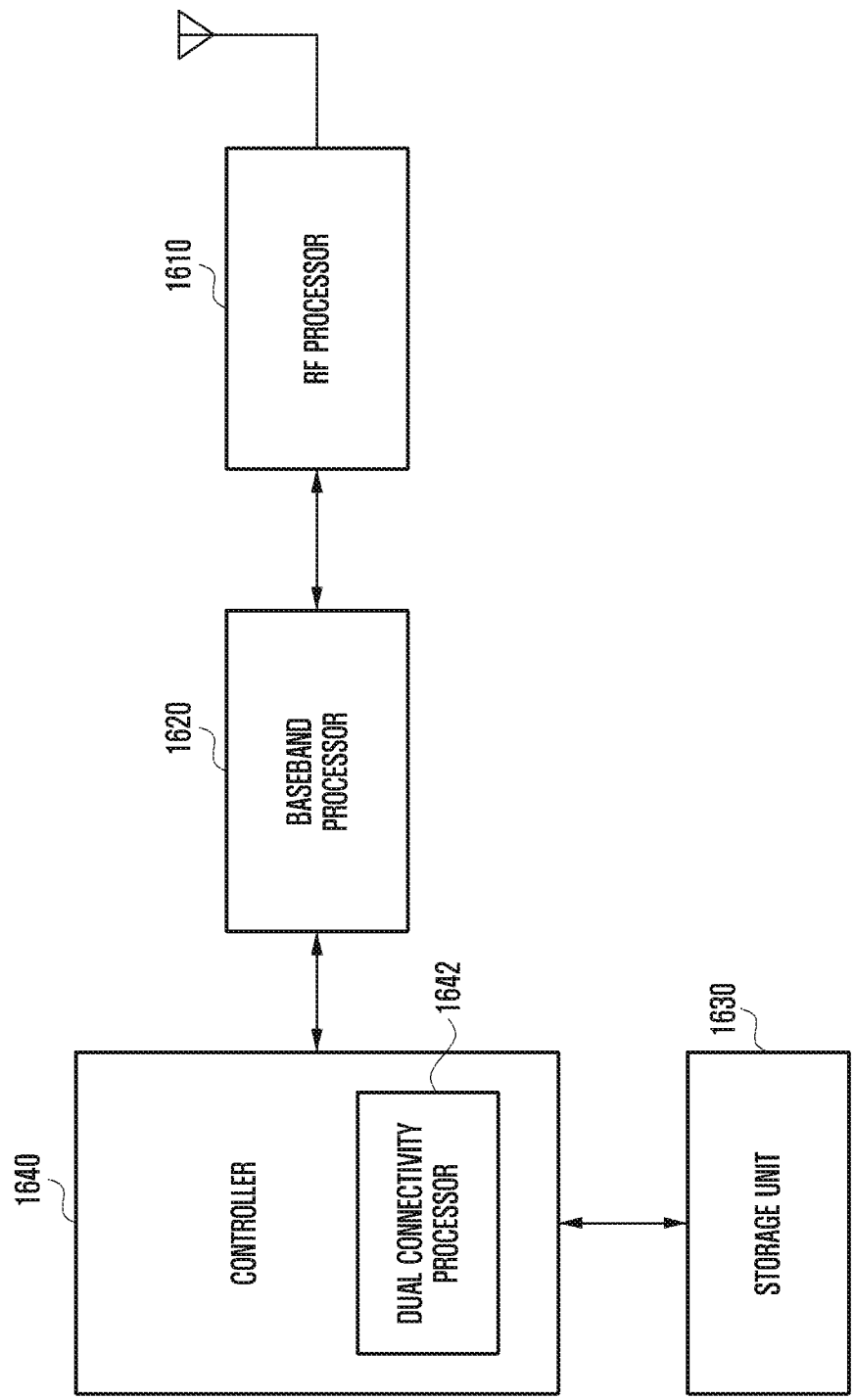
FIG. 16 is a diagram of a UE, according to an embodiment.

FIG. 16 is a diagram of a UE, according to an embodiment.

Referring to FIG. 16, the UE includes a radio frequency (RF) processor 1610, a baseband processor 1620, a storage unit 1630 and a controller 1640.

The RF processor 1610 performs functions for transmitting/receiving a signal through a radio channel, such as the band conversion and amplification of a signal. The RF processor 1610 up-converts a baseband signal received from the baseband processor 1620 into an RF band signal, transmits the RF band signal through an antenna, and down-converts an RF band signal received through the antenna into a baseband signal. The RF processor 1610 may include a transmission filter, a reception filter, an amplifier, a mixer, an oscillator, a digital to analog convertor (DAC), and an analog to digital convertor (ADC). While only one antenna has been illustrated, the UE may include multiple antennas. The RF processor 1610 may include multiple RF chains. The RF processor 1610 may perform beamforming, and for the beamforming, the RF processor 1610 may adjust the phase and size of each of signals transmitted/received through multiple antennas or antenna elements. The RF processor may perform MIMO, and when the MIMO operation is performed, the RF processor may receive multiple layers. The RF processor 1610 may configure multiple antenna or antenna elements under the control of the controller, and may perform received beam swiping or adjust the direction and beam width of the received beam so that the received beam cooperates with a transmitted beam.

The baseband processor 1620 performs a baseband signal and inter-bit stream conversion function based on the physical layer standard of a system. When data is transmitted, the baseband processor 1620 generates complex symbols by coding and modulating a transmission bit stream. When data is received, the baseband processor 1620 reconstructs a reception bit stream from a baseband signal received from the RF processor 1610 through modulation and demodulation. If an orthogonal frequency division multiplexing (OFDM) scheme is applied, when data is transmitted, the baseband processor 1620 generates complex symbols by coding and modulating a transmission bit stream, maps the complex symbols to subcarriers, and then configures OFDM symbols through inverse fast Fourier transform (IFFT) operation and cyclic prefix (CP) insertion. When data is received, the baseband processor 1620 segments a baseband signal received from the RF processor 1610 in an OFDM symbol unit, reconstructs signals mapped to subcarriers through fast Fourier transform (FFT) operation, and reconstructs a reception bit stream through modulation and demodulation.

The baseband processor 1620 and the RF processor 1610 transmit and receive signals as described above. The baseband processor 1620 and the RF processor 1610 may be called a transmitter, a receiver, a transceiver or a communication unit. At least one of the baseband processor 1620 and the RF processor 1610 may include multiple communication modules in order to support different multiple radio access technologies. At least one of the baseband processor 1620 and the RF processor 1610 may include different communication modules in order to process signals of different frequency bands. The different radio access technologies may include an LTE network and an NR network. The different frequency bands may include a super high frequency (SHF) (e.g., 2.5 GHz, 5 GHz) band and a millimeter wave (e.g., 60 GHz) band.

The storage unit 1630 stores data, such as a basic program, an application program, and configuration information for the operation of the UE. The storage unit 1630 provides stored data in response to a request from the controller 1640.

The controller 1640 controls an overall operation of the UE. The controller 1640 transmits/receives a signal through the baseband processor 1620 and the RF processor 1610. The controller 1640 writes data in the storage unit 1640 and reads data from the storage unit 1640. To this end, the controller 1640 may include at least one processor. The controller 1640 may include a communication processor (CP) performing control for communication and an application processor (AP) controlling a higher layer, such as an application program.

Figure 17:
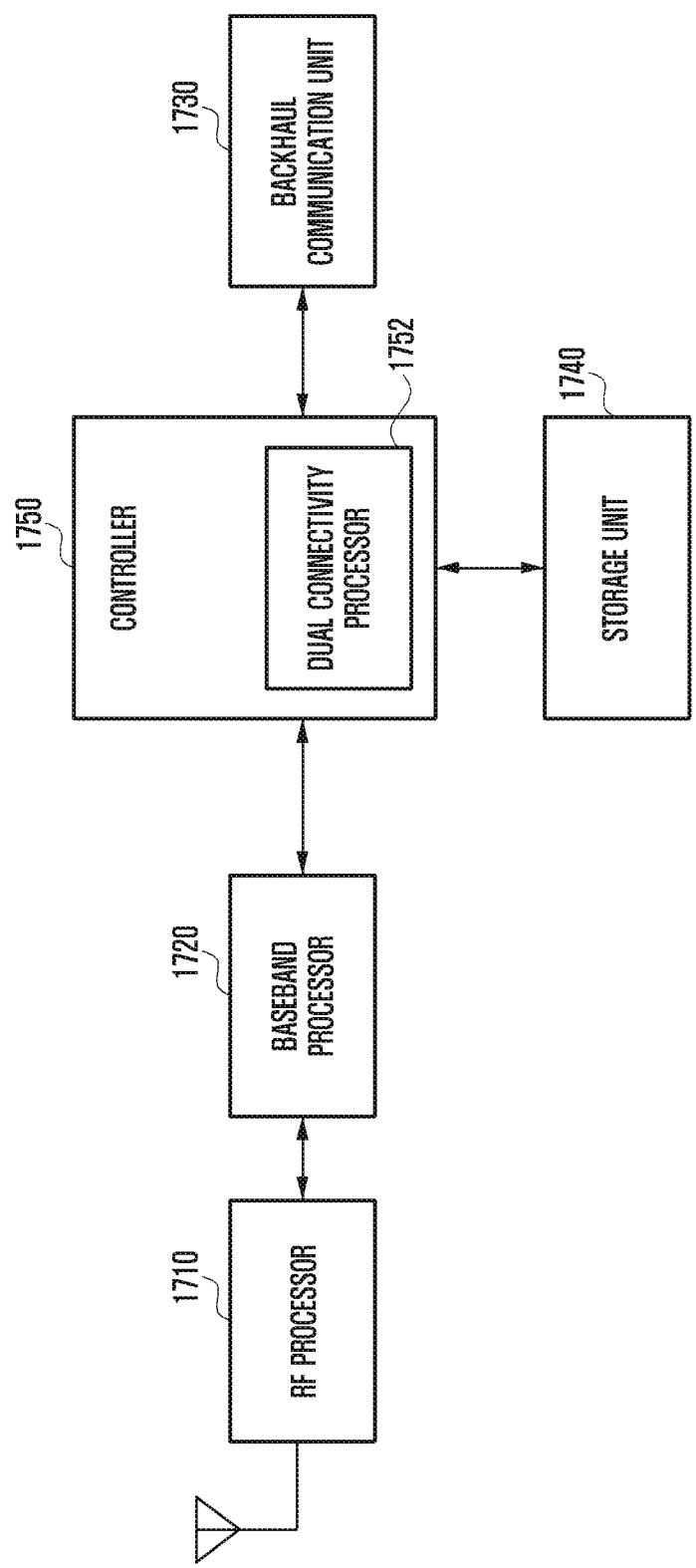
FIG. 17 is a diagram of an evolved node b (ENB) in a wireless communication system, according to an embodiment.

FIG. 17 is a diagram of an ENB in a wireless communication system, according to an embodiment.

Referring to FIG. 17, the ENB includes an RF processor 1710, a baseband processor 1720, a backhaul communication unit 1730, a storage unit 1740 and a controller 1750.

The RF processor 1710 performs a function for transmitting/receiving a signal through a radio channel, such as the band conversion and amplification of a signal. The RF processor 1710 up-converts a baseband signal received from the baseband processor 1720 into an RF band signal, transmits the RF band signal through an antenna, and down-converts an RF band signal received through the antenna into a baseband signal. The RF processor 1710 may include a transmission filter, a reception filter, an amplifier, a mixer, an oscillator, a DAC, and an ADC. While only one antenna has been illustrated, the ENB may include multiple antennas. The RF processor 1710 may include multiple RF chains. The RF processor 1710 may perform beamforming, and for the beamforming, the RF processor 1710 may adjust the phase and size of each of signals transmitted/received multiple antennas or antenna elements. The RF processor may perform a downlink MIMO operation by transmitting one or more layers.

The baseband processor 1720 performs a baseband signal and inter-bit stream conversion function based on the physical layer standard of a first radio access technology. When data is transmitted, the baseband processor 1720 generates complex symbols by coding and modulating a transmission bit stream. When data is received, the baseband processor 1720 reconstructs a reception bit stream from a baseband signal received from the RF processor 1710 through modulation and demodulation. If the OFDM scheme is applied, when data is transmitted, the baseband processor 1720 generates complex symbols by coding and modulating a transmission bit stream, maps the complex symbols to subcarriers, and configures OFDM symbols through IFFT operation and CP insertion. When data is received, the baseband processor 1720 segments a baseband signal received from the RF processor 1710 in an OFDM symbol unit, reconstructs signals mapped to subcarriers through FFT operation, and then reconstructs a reception bit stream through modulation and demodulation. The baseband processor 1720 and the RF processor 1710 transmit and receive signals as described above. Accordingly, the baseband processor 1720 and the RF processor 1710 may be called a transmitter, a receiver, a transceiver, a communication unit or a wireless communication unit.

The communication unit 1730 provides an interface for performing communication with other nodes within a network.

The storage unit 1740 stores data, such as a basic program, an application program, and configuration information for the operation of the primary ENB. Specifically, the storage unit 1740 may store information on a bearer allocated to an accessed UE and measurement results reported by an accessed UE. The storage unit 1740 may store information, that is, a criterion by which whether to provide a UE with multiple connections is determined. The storage unit 1740 provides stored data in response to a request from the controller 1750.

The controller 1750 controls an overall operation of the primary ENB. The controller 1750 transmits/receives a signal through the baseband processor 1720 and the RF processor 1710 or through the backhaul communication unit 1730. The controller 1750 writes data in the storage unit 1740 and reads data from the storage unit 1740. To this end, the controller 1750 may include at least one processor.

In accordance with the disclosure, the data processing speed of a UE can be improved by proposing an efficient method for a UE to distribute transmission resources, in both the LTE system and a next-generation mobile communication system.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof.

What is claimed is:

1. A method by a transmitter to transmit information in a communication system, the method comprising:
   receiving information for allocating at least two transmission resources;
   determining whether a transmission time interval (TTI) or a numerology corresponding to the at least two transmission resources are the same;
   identifying at least one data unit corresponding to a plurality of logical channel;
   determining each size of each data unit corresponding to each of the plurality of logical channel to be transmitted based on a total size of the at least two transmission resources, in case that the TTI or the numerology corresponding to the at least two transmission resources are the same;

allocating the at least one data unit to the at least two transmission resources based on the size of the data unit to be transmitted in the plurality of logical channel, wherein a data unit allocable without segmentation among the at least one data unit is allocated to the at least two transmission resources based on the size of the data unit to be transmitted in the plurality of logical channel;

allocating data to the plurality of the logical channel based on each size of each data unit and the total size of the at least two transmission resources;

segmenting a data unit of data units not allocated to the at least two transmission resources based on a size of a transmission resource with a smallest size; and transmitting the data to a receiver.

2. The method of claim 1, wherein unsegmented data units are contiguously allocated on a transmission resource of the at least two transmission resources.

3. The method of claim 1, wherein each size of each data unit to be transmitted in the plurality of logical channel is determined based on a prioritized bit rate (PBR) corresponding to the plurality of logical channel, and
wherein the PBR is determined based on the information for allocating the at least two transmission resources.

4. The method of claim 1, further comprising determining each size of each data unit to be transmitted based on the size of the allocated at least two transmission resources, in case that TTI information and numerology information respectively corresponding to the at least two transmission resources are identical.

5. A transmitter in a communication system, the transmitter comprising:
a transceiver; and
a controller coupled with the transceiver and configured to:
receive information for allocating at least two transmission resources,
determine whether a transmission time interval (TTI) or a numerology corresponding to the at least two transmission resources are the same,
identify at least one data unit corresponding to a plurality of logical channel,
determine each size of each data unit corresponding to each of the plurality of logical channel to be transmitted based on a total size of the at least two transmission resources, in case that the TTI or the numerology corresponding to the at least two transmission resources are the same,
allocating the at least one data unit to the at least two transmission resources based on the size of the data unit to be transmitted in the plurality of logical channel,
wherein a data unit allocable without segmentation among the at least one data unit is allocated to the at least two transmission resources based on the size of the data unit to be transmitted in the plurality of logical channel,
allocate data to the plurality of the logical channel based on each size of each data unit and the total size of the at least two transmission resources,
segmenting a data unit of data units not allocated to the at least two transmission resources based on a size of a transmission resource with a smallest size, and
transmit data to a receiver.

6. The transmitter of claim 5, wherein unsegmented data units are contiguously allocated on a transmission resource of the at least two transmission resources.

7. The transmitter of claim 5, wherein each size of each data unit to be transmitted in the plurality of logical channel is determined based on a prioritized bit rate (PBR) corresponding to the plurality of logical channel, and
wherein the PBR is determined based on the information for allocating the at least two transmission resources.

8. The transmitter of claim 5, wherein the controller is further configured to determine each size of each data unit to be transmitted based on the size of the allocated at least two transmission resources, in case that TTI information and numerology information respectively corresponding to the at least two transmission resources are identical.

* * * * *